United States Patent
Choi

(10) Patent No.: US 10,481,724 B2
(45) Date of Patent: Nov. 19, 2019

(54) TOUCH SCREEN CONTROLLER, SYSTEM AND METHOD

(71) Applicant: Samsung Electronics Co., Ltd., Suwon-si, Gyeonggi-do (KR)

(72) Inventor: Yoon-kyung Choi, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 78 days.

(21) Appl. No.: 15/815,130

(22) Filed: Nov. 16, 2017

(65) Prior Publication Data

US 2018/0260067 A1 Sep. 13, 2018

(30) Foreign Application Priority Data

Mar. 9, 2017 (KR) .................. 10-2017-0030272

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 2203/04105* (2013.01)

(58) Field of Classification Search
CPC ............... G06F 3/0414; G06F 3/0416; G06F 2203/04105; G06F 3/044
See application file for complete search history.

(56) References Cited

U.S. PATENT DOCUMENTS

| 8,803,838 | B2 | 8/2014 | Haga et al. |
| 9,348,476 | B2 | 5/2016 | Lee |
| 2011/0210927 | A1 | 9/2011 | Mizuhashi et al. |
| 2016/0092015 | A1 | 3/2016 | Al-Dahle et al. |
| 2016/0103542 | A1 | 4/2016 | Ogata et al. |
| 2017/0010740 | A1* | 1/2017 | Chuang ............... G06F 3/0416 |
| 2017/0277350 | A1* | 9/2017 | Wang ................... G06F 3/0418 |

FOREIGN PATENT DOCUMENTS

| KR | 2015-0071875 A | 6/2015 |
| KR | 10-1582597 B1 | 1/2016 |

OTHER PUBLICATIONS

Kurth Reynolds et al., "Touch and Display Integration with Force," SID 2016 Digest, Synaptics, San Jose, California, pp. 617-620.

* cited by examiner

*Primary Examiner* — Muhammad N Edun
(74) *Attorney, Agent, or Firm* — Harness, Dickey & Pierce, P.L.C.

(57) ABSTRACT

In one embodiment, the touch screen controller includes a sensing circuit configured to generate touch data and force data by processing a single output signal from a touch panel. The touch data indicates whether a touch input is detected, and the force data indicates an amount of force of the touch input.

19 Claims, 26 Drawing Sheets

TOUCH SCREEN CONTROLLER, SYSTEM AND METHOD

CROSS-REFERENCE TO RELATED APPLICATION

This application claims the benefit of Korean Patent Application No. 10-2017-0030272, filed on Mar. 9, 2017, in the Korean Intellectual Property Office, the disclosure of which is incorporated herein in its entirety by reference.

BACKGROUND

The inventive concepts relate to a semiconductor device, and more particularly, to a touch screen controller that performs a touch sensing operation and a force sensing operation at the same time, a system and/or a method.

A touch sensing system detects an object approaching or contacting a touch panel including sensing units and provides touch information regarding the approach or the contact. Touch information may include a touch location on the touch panel. Recent touch sensing systems may provide touch information including not only touch locations, but also information regarding touch force. Therefore, an electronic device including a touch sensing system may provide various user responses based on a touch location and touch force in response to a touch of a user.

When a touch sensing system performs a display operation, a touch sensing operation, and a force sensing operation in a time-sharing manner, a touch location detection and touching force detection are performed within a limited time, and thus, sensing sensitivity and image quality may be deteriorated.

SUMMARY

At least one embodiment is directed to a touch screen controller.

In one embodiment, the touch screen controller includes a sensing circuit configured to generate touch data and force data by processing a single output signal from a touch panel. The touch data indicates whether a touch input is detected, and the force data indicates an amount of force of the touch input.

Another embodiment relates to a system.

In one embodiment, the system includes a first sensing electrode at a first layer and a second sensing electrode at a second layer. The second layer is spaced from the first layer, and the second sensing electrode faces the first sensing electrode. A supply circuit is configured to selectively provide a first modulated signal to the first sensing electrode, and selectively provide a second modulated signal to the second sensing electrode. The first modulated signal and the second modulated signal have different modulated characteristics. A sensing circuit is configured to generate touch data and force data by processing a single output signal from the first sensing electrode. The touch data indicates whether a touch input is detected, and the force data indicates an amount of force of the touch input.

In a further embodiment, the system includes a touch panel; and a single chip including a display driving integrated circuit and a touch screen controller. The display driving integrated circuit and the touch screen controller are configured to operate in synchronization with one another, and the touch screen controller is configured to generate touch data and force data by processing a single output signal from the touch panel. The touch data indicates whether a touch input is detected, and the force data indicates an amount of force of the touch input.

At least one embodiment relates to a method.

In one embodiment, the method includes generating touch data and force data based on output from a single sensing electrode of a touch panel. The touch data indicates whether a touch input is detected, and the force data indicates an amount of force of the touch input.

In another embodiment, the method includes concurrently sensing, by a circuit, touch and force of touch for a touch panel.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Figure 1:
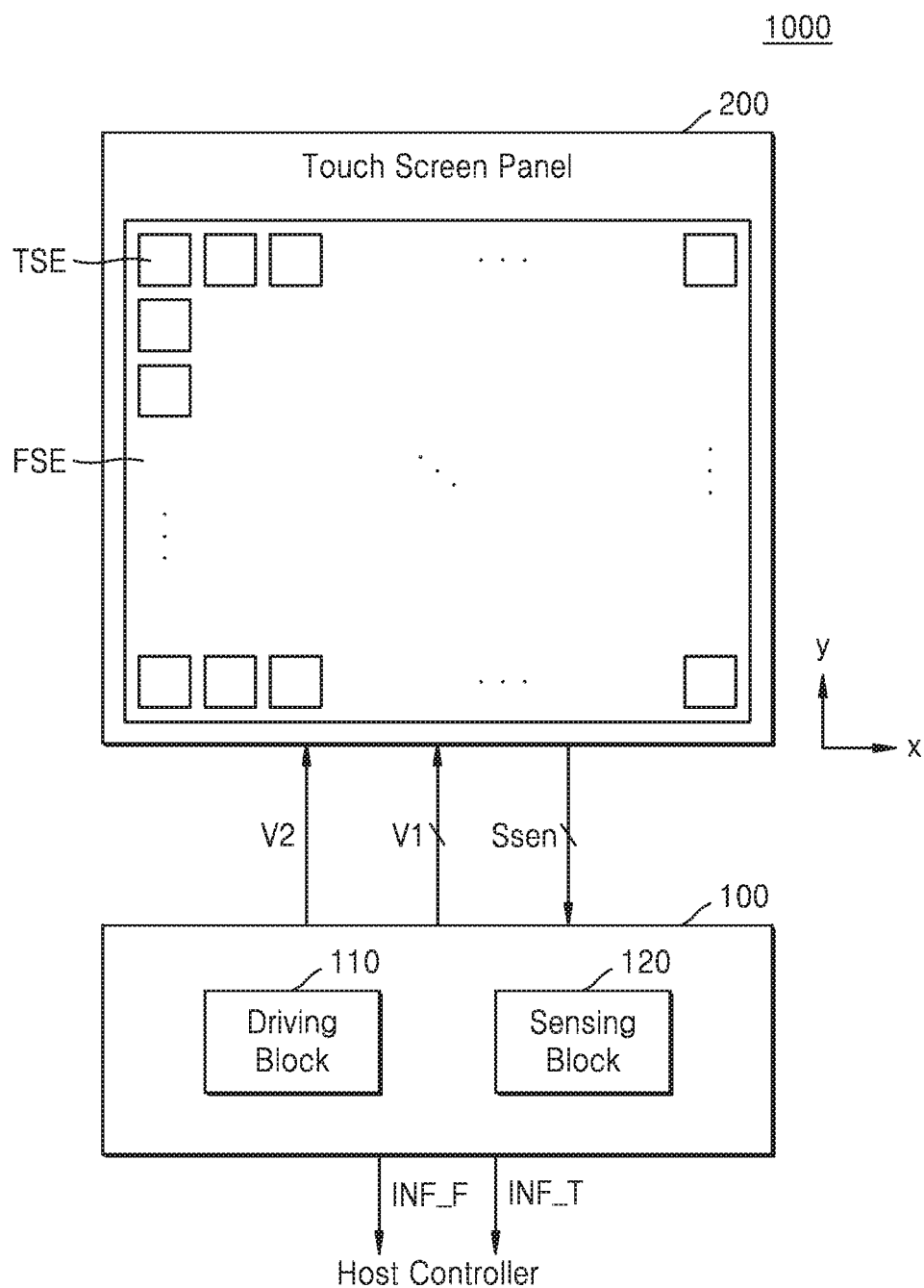
FIG. 1 is a block diagram showing a touch sensing system according to an embodiment of the inventive concepts.
Figure 2:
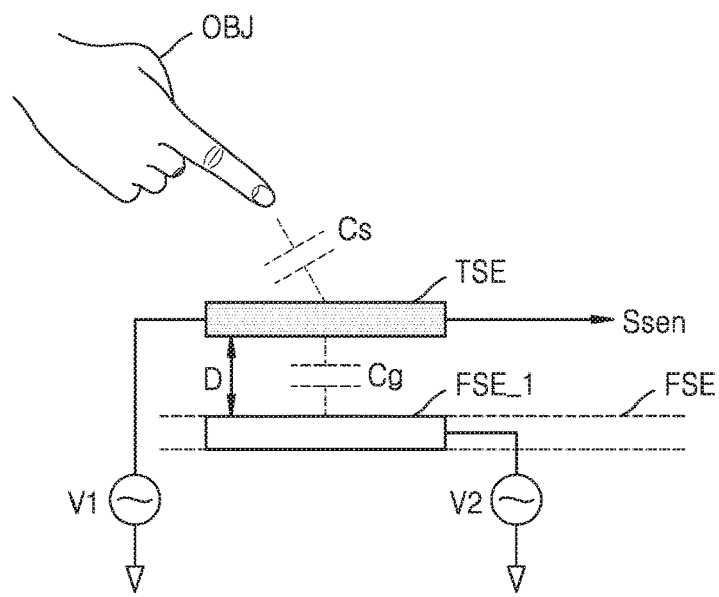
FIG. 2 is a diagram for describing a capacitance change due to a touch input to the touch screen panel of FIG. 1.

FIG. 1 is a block diagram showing a touch sensing system according to an embodiment of the inventive concepts, and FIG. 2 is a diagram for describing a capacitance change due to a touch input to a touch screen panel of FIG. 1.

Referring to FIG. 1, a touch sensing system 1000 may include a touch screen panel 200 and a touch screen controller 100.

The touch screen panel 200 may include a plurality of touch sensing electrodes TSE and a force sensing electrode FSE. The force sensing electrode FSE may be located below or above the plurality of touch sensing electrodes TSE. A gap layer may be provided between the plurality of touch sensing electrodes TSE and the force sensing electrode FSE. The thickness of the gap layer may be changed by a touch input. The touch sensing electrodes TSE and the force sensing electrode FSE may include a transparent conductive material, such as indium tin oxide (ITO), indium zinc oxide (IZO), or indium tin zinc oxide (ITZO). In the inventive concepts, the touch sensing electrode TSE may be referred to as a first sensing electrode, whereas the force sensing electrode FSE may be referred to as a second sensing electrode. The force sensing electrode FSE may also be referred to as a gap electrode.

The plurality of touch sensing electrodes TSE may be arranged in a matrix form and constitute a touch sensor. Each of the plurality of touch sensing electrodes TSE may operate as a touch sensing cell. When a touch input occurs as an object (or a conductive object), such as a finger, a touch pen, or a stylus pen, approaches or contacts the touch screen panel 200, a capacitance Cs (hereinafter referred to as a sensing capacitance) is generated between a touch sensing cell disposed at the location where the touch input occurred (that is, the touch sensing electrode TSE) and an object, as shown in FIG. 2A. The touch screen controller 100 applies an alternating current (AC) signal to the touch sensing electrode TSE and analyzes a single output signal from the touch screen panel 200, for example, a sensing signal Ssen, thereby detecting a change in the sensing capacitance Cs according to the touch input. The touch screen controller 100 detects a change in the sensing capacitance Cs for each of a plurality of touch sensing electrodes TSE, thereby detecting the occurrence of a touch input and a position at which the touch input occurred. For example, on the touch screen panel 200, a position of the touch sensing electrode TSE corresponding to the largest change of the sensing capacitance Cs may be detected as a position where a touch input occurred.

The plurality of touch sensing electrodes TSE may constitute a force sensor together with the force sensing electrode FSE. Each of the plurality of touch sensing electrodes TSE may operate as a force sensing cell together with the force sensing electrode FSE.

As shown in FIG. 2, the touch sensing electrode TSE may be arranged a certain distance D apart from the force sensing electrode FSE. A capacitance Cg (hereinafter referred to as a gap capacitance) is formed between the touch sensing electrode TSE and a region FSE_1 of the force sensing electrode FSE corresponding to the touch sensing electrode TSE.

As described above, a gap layer may be disposed between the touch sensing electrode TSE and the force sensing electrode FSE, and the thickness of the gap layer may vary according to touch forces. Therefore, when a touch input occurs as an object touches the touch screen panel 200, the distance between the touch sensing electrode TSE and the force sensing electrode FSE may be changed by the touch force, and the gap capacitance Cg may be changed at the position of the touch screen panel 200 where the touch input occurred and a surrounding region thereof. The touch screen controller 100 applies AC signals respectively to the plurality of touch sensing electrodes TSE and the force sensing electrodes FSE and analyzes a signal output from the touch screen panel 200, thereby detecting a change of the gap capacitance Cg based on a touch input. The touch screen controller 100 may detect the touch force based on the change of gap capacitance Cg.

According to an embodiment, the touch screen panel 200 may be an in-cell type panel in which the touch sensing electrode TSE is connected to a display pixel, and the plurality of touch sensing electrodes TSE may include one or more elements constituting a display pixel, e.g., a source driver line, a gate line, an anode pixel electrode, and a cathode pixel electrode. Alternatively, a plurality of touch sensing electrodes TSE may be a common electrode to which a display common voltage is applied. Hereinafter, the touch screen panel 200 will be described below as in-cell type touch screen panel. However, the inventive concepts are not limited thereto, and the touch screen panel 200 may also be an on-cell type in which the touch sensing electrode TSE is disposed above a display panel. Alternatively, the touch sensing electrode TSE may be disposed on a substrate (or glass) separate from a display panel. The touch screen panel 200 may be embodied as a liquid crystal display (LCD), a light emitting diode (LED) display, an organic LED (OLED) display, an active matrix OLED display, and a flexible display, and may also be embodied as other types of flat panel displays.

The touch screen controller 100 applies a driving signal, such as a first modulated signal V1 and a second modulated signal V2, to the touch screen panel 200 and analyzes a single sensing signal Ssen, which is changed as a touch input occurs, thereby detecting a touch and a touch force. The touch screen controller 100 may generate touch location information INF_T and touch force information INF_F (see FIG. 1) according to a result of the detection.

The first modulated signal V1 and the second modulated signal V2 are AC signals. The first modulated signal V1 and the second modulated signal V2 are signals modulated according to a same modulation method, but modulated characteristics thereof may be different from each other. For example, the first modulated signal V1 and the second modulated signal V2 may be signals modulated according to at least one modulation method from among frequency modulation, phase modulation, and code modulation. The first modulated signal V1 and the second modulated signal V2 may be distinguished from each other in terms of frequency, code, or phase. According to an embodiment, the first modulated signal V1 and the second modulated signal V2 may have the same frequency and amplitude and may have different phases. The phase difference between the first modulated signal V1 and the second modulated signal V2 may be 90 degrees.

According to another embodiment, the first modulated signal V1 and the second modulated signal V2 may have the same amplitude and may have different frequencies. According to an embodiment, the frequency of the first modulated signal V1 and the frequency of the second modulated signal V2 may be orthogonal to each other.

According to an embodiment, the first modulated signal V1 and the second modulated signal V2 may be modulated signals encoded by different codes, and the code applied to the first modulated signal V1 and the code applied to the second modulated signal V2 may be orthogonal to each other. The frequency and amplitude of the first modulated signal V1 and the second modulated signal V2 may be the same.

As shown in FIG. 2, the touch screen controller 100 may apply the first modulated signal V1 to the touch sensing electrode TSE and apply the second modulated signal V2 to the force sensing electrode FSE. The touch screen controller 100 may receive the sensing signal Ssen according to the first modulated signal V1 and the second modulated signal V2 from the touch sensing electrode TSE, analyze the sensing signal Ssen, and generate a touch signal and a force signal.

The sensing signal Ssen varies according to changes of the gap capacitance Cg and the sensing capacitance Cs. The touch screen controller 100 may demodulate (or decode) the sensing signal Ssen based on the first modulated signal V1 and the second modulated signal V2 to divide the sensing signals Ssen into a signal component corresponding to the first modulated signal V1 (hereinafter referred to as a first sensing signal) and a signal component corresponding to the second modulated signal V2 (hereinafter referred to as a second sensing signal) and generate a touch signal and a force signal based on the first sensing signal and the second sensing signal.

As shown in FIG. 1, the touch screen controller 100 may include a driving block 110 and a sensing block 120. The driving block 110 may generate the first modulated signal V1 and the second modulated signal V2 and provide the first modulated signal V1 and the second modulated signal V2 to the touch sensing electrode TSE and the force sensing electrode FSE, respectively.

The sensing block 120 may generate the touch location information INF_T and the touch force information INF_F based on the sensing signals Ssen received from the touch sensing electrodes TSE. The sensing block 120 may generate the first sensing signal corresponding to the first modulated signal V1 and the second sensing signal corresponding to the second modulated signal V2 based on the sensing signal Ssen received from the touch sensing electrode TSE, and generates a touch signal and a force signal (or touch data and force data) by processing the first sensing signal and the second sensing signal.

The touch sensing system 1000 may further include a switching unit (not shown) for connecting a plurality of inputs and outputs of the touch screen panel 200 to the touch screen controller 100. The switching unit may be provided on the touch screen panel 200. For example, when the touch screen panel 200 is an LCD panel, the switching unit may include TFT transistors. However, the inventive concepts are not limited thereto. The switching unit may be disposed in the touch screen controller 100 or may be disposed separately from the touch screen panel 200 and the touch screen controller 100.

The touch sensing system 1000 according to an embodiment of the inventive concepts includes the touch screen panel 200 capable of sensing a touch and touch force, and the touch screen controller 100 drives the touch screen panel 200 based on the first modulated signal V1 and the second modulated signal V2 that are distinguished from each other based on modulated characteristics. Therefore, touch sensing and force sensing may be performed simultaneously.

In the in-cell type touch screen panel 200, one of the electrodes constituting a display pixel is used as a sensing electrode, e.g., the touch sensing electrode TSE. Therefore, the touch sensing system 1000 performs a touch sensing operation and a force sensing operation in a period other than a displaying period. When the touch sensing operation and the force sensing are performed in a time-sharing manner, a display operation, a touch sensing operation, and a force sensing operation are performed within one frame period (e.g., 1/60 Hz), and thus, an insufficient time period may be allocated to each operation. As a result, sensing sensitivity may be lowered and image quality may be deteriorated.

However, the touch sensing system 1000 according to an embodiment of the inventive concepts drives the touch screen panel 2000 based on the first modulated signal V1 and the second modulated signal V2 that are distinguished from each other based on modulated characteristics, and thus the sensing signal Ssen may be easily separated into a touch signal and a force signal. Since the touch sensing system 1000 may simultaneously perform a touch sensing operation and a force sensing operation, a force sensing function may be implemented without allocating any extra time for force sensing. Therefore, the touch and force sensing performance of the touch sensing system 1000 and the quality of images displayed thereat may be improved.

Figure 3A:
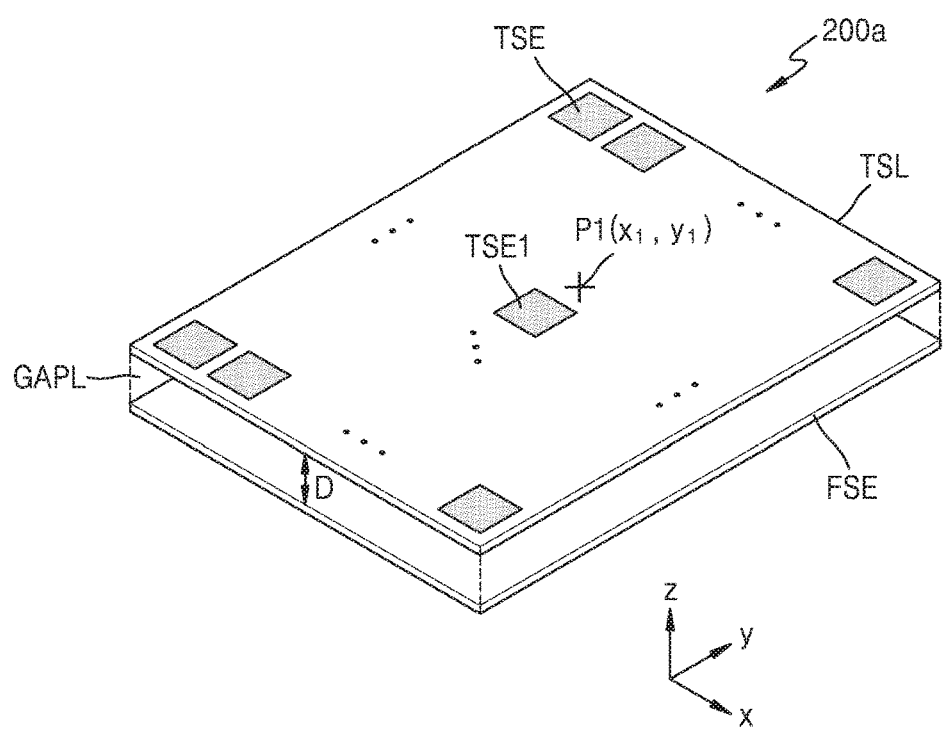
FIG. 3A is a diagram showing an example of a touch screen panel.
Figure 3B:
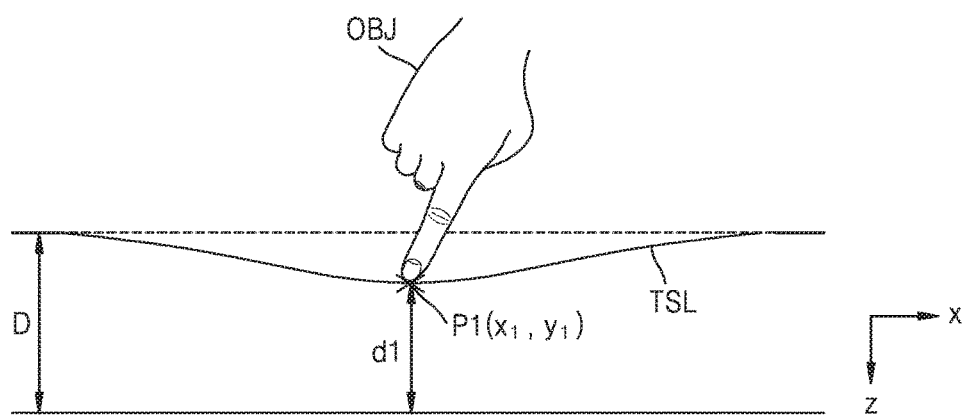
FIG. 3B is a diagram showing a thickness change of a gap layer due to a touch input.

FIG. 3A is a diagram showing an example of a touch screen panel, and FIG. 3B is a diagram showing a thickness change of a gap layer due to a touch input.

Referring to FIG. 3A, a touch screen panel 200a may include a touch sensing layer TSL having formed thereon a plurality of touch sensing electrodes TSE, a gap layer GAPL, and a force sensing electrodes FSE. Although the touch screen panel 200a may include various other layers, the other layers are not shown for convenience of explanation.

The plurality of touch sensing electrodes TSE may be arranged in a matrix form on the x-y plane. The force sensing electrode FSE may be disposed to face the plurality of touch sensing electrodes TSE. The gap layer GAPL may be between the plurality of touch sensing electrodes TSE (or the touch sensing layer TSL) and the force sensing electrode TSE. The gap layer GAPL may include an air gap, an insulating film, etc. Furthermore, the gap layer GAPL may include an electrically insulating material. The gap layer GAPL has a certain thickness D and, when a touch input occurs, the thickness of the gap layer GAPL at the point corresponding to the touch input may be reduced.

Although FIG. 3A shows that the force sensing electrode FSE is disposed below the touch sensing layer TSL, the inventive concepts is not limited thereto. The force sensing electrode FSE may be disposed above the touch sensing layer TSL. For example, the gap layer GAPL may be stacked on the top of the touch sensing layer TSL, and the force sensing electrode FSE may be stacked on the top of the gap layer GAPL.

When a touch input is generated at a first point P1 (x1, y1) on the touch screen panel 200a, the change in the sensing capacitance Cs of a touch sensing electrode, i.e. the first touch sensing electrode TSE1, disposed closest to the first point P1 (x1, y1) may be the most significant. As shown in FIG. 3B, the touch sensing layer TSL is bent by the force of a touch input, and the thickness of the gap layer GAPL may be reduced most significantly at the first point P1 (x1, y1). The gap capacitance Cg may be proportional to the area of the touch sensing electrode TSE and inversely proportional to a distance between the touch sensing electrode TSE and the force sensing electrode FSE. Therefore, as the thickness of the gap layer GAPL is reduced, the gap capacitance Cg at the first point P1 (x1, y1) may increase.

Figure 4:
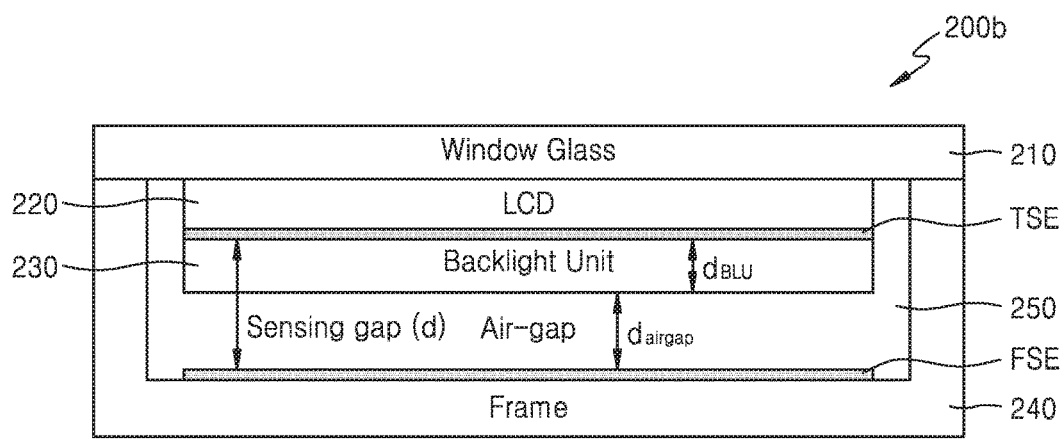
FIG. 4 is a schematic vertical cross-sectional diagram showing an embodiment of a touch screen panel according to an embodiment of the inventive concepts.

FIG. 4 is a schematic vertical cross-sectional diagram showing an embodiment of a touch screen panel according to an embodiment of the inventive concepts. FIG. 4 shows an example in which a touch screen panel 200b is implemented as an LCD panel, and the touch screen panel 200b may be an in-cell type panel in which the touch sensing electrode TSE is integrated in a display pixel.

Referring to FIG. 4, the touch screen panel 200b includes a window glass 210, an LCD layer 220, a backlight unit 230, a frame 240, the touch sensing electrode TSE, the force sensing electrode FSE, and an air gap 250. An edge portion of a structure (hereinafter, referred to as a display module) in which the window glass 210, the LCD layer 220, and the backlight unit 230 are stacked is fixed to the frame 240, and the air gap 250 may be formed between the lower top surface of the frame 240 and the display module.

A thin-film transistor (TFT) and a liquid crystal layer may be disposed at the LCD layer 220. At least one of a gate electrode, a data electrode, and a common electrode constituting TFT transistors may be used as the touch sensing electrode TSE.

The gap capacitance Cg(x, y) of one point (x, y) on the touch screen panel 200b of FIG. 4 may be expressed as defined by Equation 1.

$$Cg(x, y) = \frac{\varepsilon_{BLU} \cdot \varepsilon_0 \cdot \text{Area}}{\varepsilon_0 \cdot dairgap(x, y) + \varepsilon_{disp} \cdot d_{BLU}(x, y)} \quad [\text{Equation 1}]$$

Here, $\varepsilon_{BLU}$ denotes the dielectric constant of the backlight unit 230, $\varepsilon_0$ denotes the dielectric constant of the air, and Area is the area of the touch sensing electrode TSE. dairgap (x,y) denotes the thickness of the air gap 250 at the point (x, y), and $d_{BLU}$ (x,y) denotes the thickness of the backlight unit 230 at the point (x, y). When a touch input occurs at the touch screen panel 200b, the display module may be curved and the thickness of the air gap 250 may be changed. Therefore, a sensing gap d may be changed, and thus the gap capacitance Cg may be increased.

Figure 5:
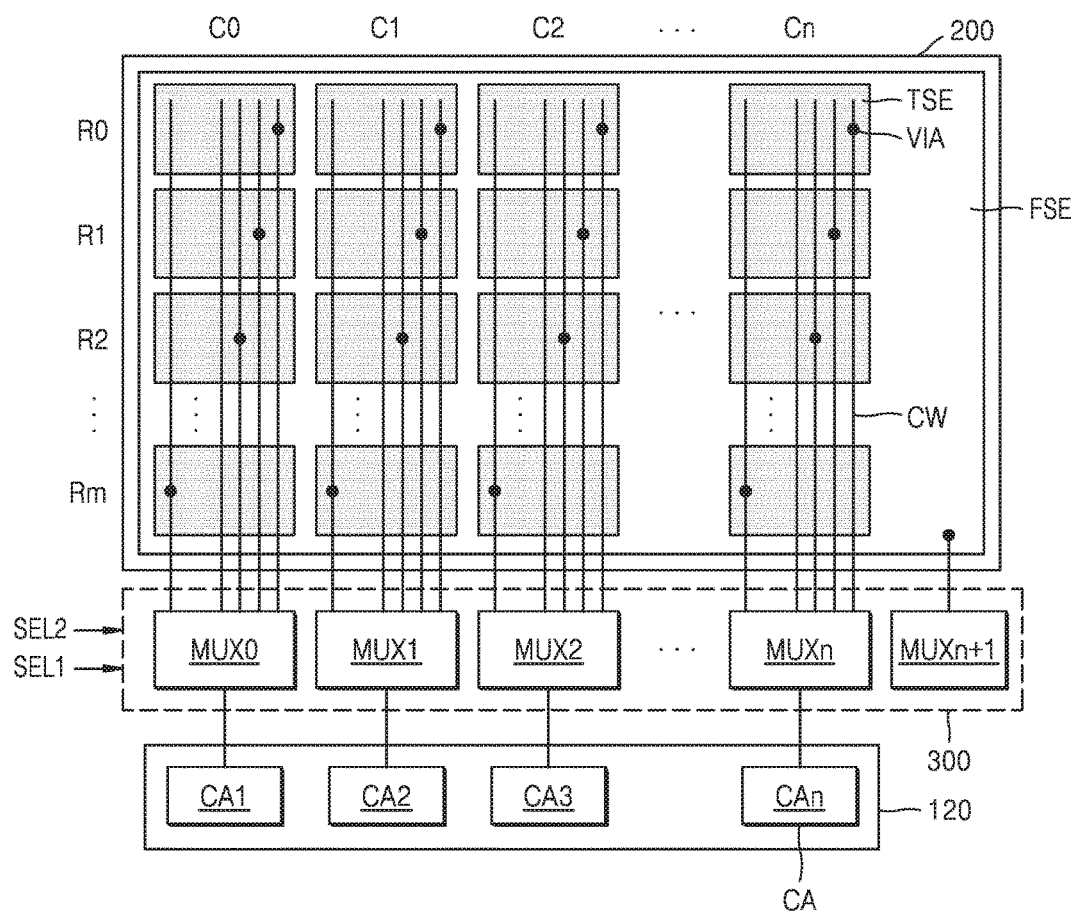
FIGS. 5 and 6 are diagrams showing an example of electrical connections between a touch sensing electrode and a force sensing electrode of a touch screen panel according to an embodiment of the inventive concepts.
Figure 6:
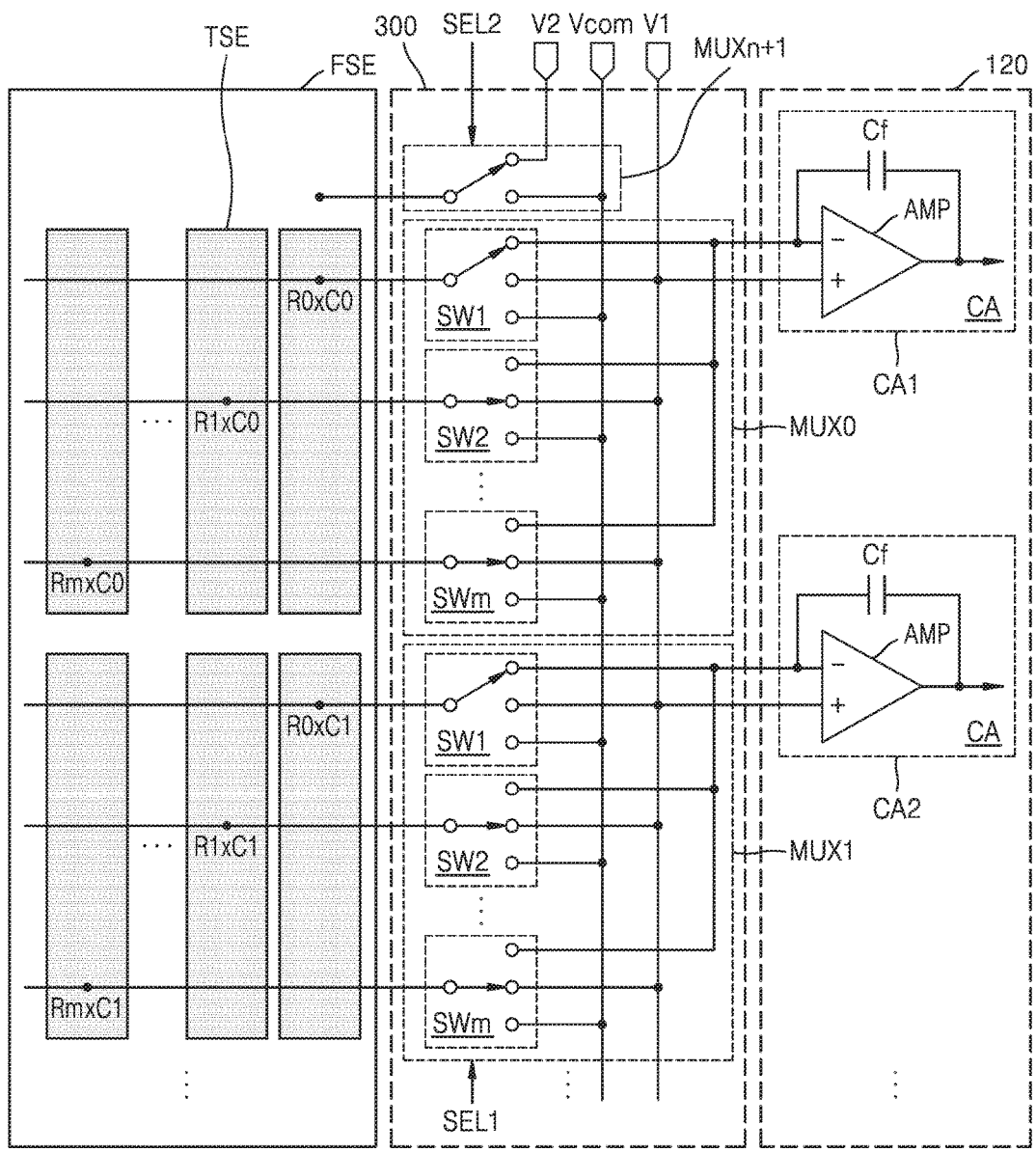

FIGS. 5 and 6 are diagrams showing an example of electrical connections between a touch sensing electrode and a force sensing electrode of a touch screen panel according to an embodiment of the inventive concepts.

Referring to FIG. 5, the plurality of touch sensing electrodes TSE may be arranged in a matrix form and may be connected to the sensing block 120 of a touch screen controller (100 in FIG. 1) via a switching unit 300. The plurality of touch sensing electrodes TSE may also be connected to the driving block 110 via the switching unit 300. Each of the plurality of touch sensing electrodes TSE may be connected to a wire CW by a via VIA and may be connected to a corresponding one of a plurality of multiplexers MUX0 through MUXn and MUXn+1 via the wire CW. According to an embodiment, wires CW may extend in the column-wise direction or the row-wise direction across the touch sensing electrodes TSE, as shown in FIG. 5. However, the inventive concepts are not limited thereto, and various methods of routing the wires CW (locations of wires, shapes of wires, etc.) may be used. For example, the wires CW may be disposed outside the touch sensing electrodes TSE on the outer surface of the touch screen panel 200, that is, on the x-y plane.

The switching unit 300 may include the plurality of multiplexers MUX0 through MUXn and MUXn+1. The switching unit 300 may include first through $n^{th}$ multiplexers MUX0 through MUXn (n is an integer equal to or greater than 2) that operate in response to a first selecting signal SEL1 and an $n+1^{th}$ multiplexer MUXn+1 that operates in response to a second selecting signal SEL2. The first selecting signal SEL1 and the second selecting signal SEL2 may be provided from the touch screen controller 100.

The plurality of touch sensing electrodes TSE may be connected to the first through $n^{th}$ multiplexers MUX0 through MUXn column-by-column. For example, the touch sensing electrodes TSE of first through $m^{th}$ rows (m is an integer equal to or greater than 2) arranged in a first column C0 may be connected to a first multiplexer MUX0, and the touch sensing electrodes TSE of the first through $m^{th}$ rows arranged in a second column C1 may be connected to a second multiplexer MUX1. As described above, the touch sensing electrodes TSE arranged in the plurality of columns C0 through Cn may be connected to a corresponding one of the first through $n^{th}$ multiplexers MUX0 through MUXn.

The first through $n^{th}$ multiplexers MUX0 through MUXn connected to the touch sensing electrodes TSE may select one of the touch sensing electrodes TSE of a plurality of rows R0 through Rm in response to the first selecting signal SEL1 and connect the selected touch sensing electrode TSE to current amplifying circuits CA1 through CAn of the sensing block 120.

Referring to FIG. 6, each of the first through $n^{th}$ multiplexers MUX0 to MUXn may include first through $m^{th}$ switches SW1 through SWm. In response to a first selecting signal SEL1, each of the first through $m^{th}$ switches SW1 through SWm may provide a common voltage Vcom or the first modulated signal V1 to a corresponding touch sensing electrode TSE, or may connect the touch sensing electrode TSE to a first end (−) of a operational amplifier AMP of a current amplifying circuit CA.

According to an embodiment, when the touch sensing electrode TSE is a common electrode, the first through $m^{th}$ switches SW1 through SWm may apply a common voltage Vcom to the touch sensing electrodes TSE during a display driving period. The touch sensing electrode TSE may perform a displaying function. During a sensing operation period, one of the first through $m^{th}$ switches SW1 through SWm may connect the corresponding touch sensing electrode TSE, that is, the selected touch sensing electrode TSE, to the current amplifying circuit CA. The selected touch sensing electrode TSE is connected to the first end (−) of the operational amplifier AMP, and the first modulated signal V1 may be applied to a second end (+) of the operational amplifier AMP. Since the first end (−) and the second end (+) of the operational amplifier AMP have the same potential, the first modulated signal V1 may be applied to the selected touch sensing electrode TSE.

Each of the other switches from among the first through $m^{th}$ switches SW1 through SWm may apply the first modulated signal V1 to a corresponding touch sensing electrode TSE. As a result, formation of a parasitic capacitance between the selected touch sensing electrode TSE and unselected touch sensing electrodes TSE may be prevented.

The force sensing electrode FSE may be connected to the n+1$^{th}$ multiplexer MUXn+1 of the switching unit 300. In response to the second selecting signal SEL2, the n+1$^{th}$ multiplexer MUXn+1 may apply a common voltage Vcom to the force sensing electrode FSE during a display driving period and apply the second modulated signal V2 to the force sensing electrode FSE during a sensing operation period.

Figure 7:
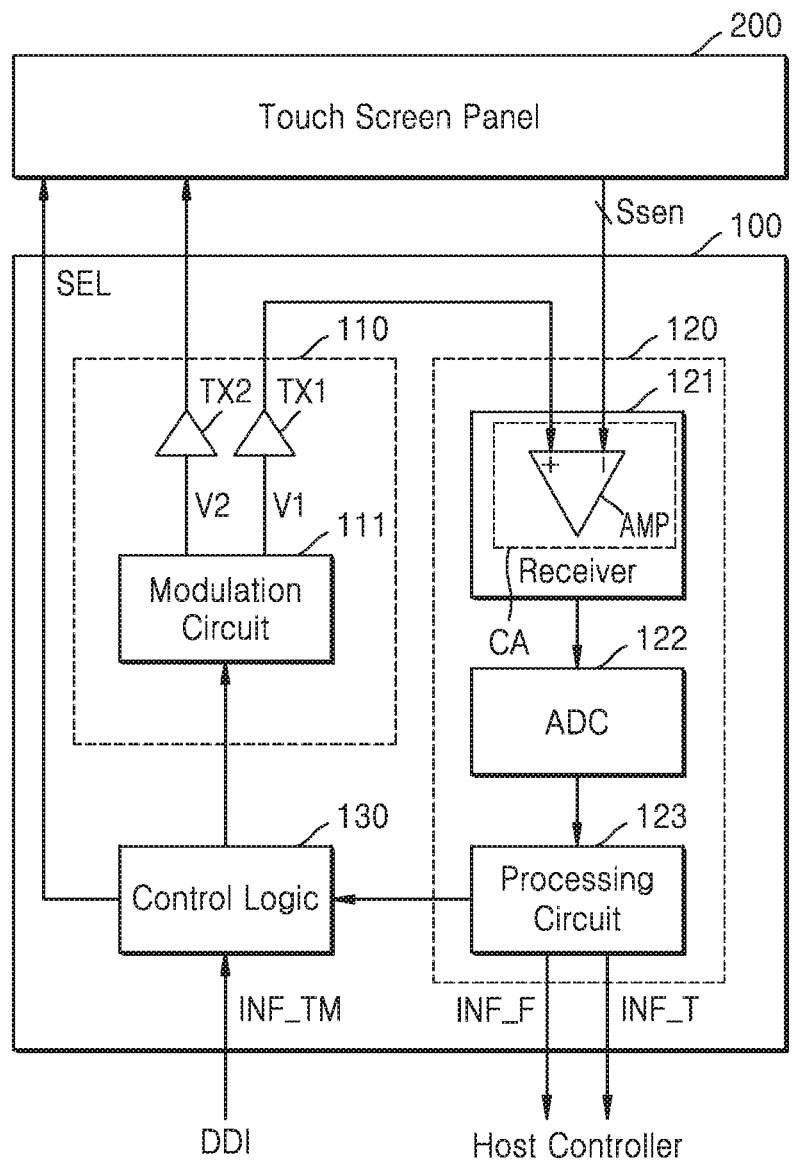
FIG. 7 is a block diagram showing a touch screen controller according to an embodiment of the inventive concepts.

FIG. 7 is a block diagram showing a touch screen controller according to an embodiment of the inventive concepts.

Referring to FIG. 7, the touch screen controller 100 may include the driving block 110, the sensing block 120, and control logic 130.

The driving block 110 may generate the first modulated signal V1 and the second modulated signal V2 and provide the first modulated signal V1 and the second modulated signal V2 to the touch screen panel 200. The driving block 110 may include a modulation circuit 111 and transmitters, i.e. a first transmitter TX1 and a second transmitter TX2.

The modulation circuit 111 may generate the first modulated signal V1 and the second modulated signal V2 according to a set modulation method. For example, the modulation circuit 111 may generate the first modulated signal V1 and the second modulated signal V2 based on a frequency modulation method, a phase modulation method, and an orthogonal code encoding method. Therefore, the first modulated signal V1 and the second modulated signal V2 may be distinguished from each other based on at least one of frequency, code, and phase.

The first transmitter TX1 and the second transmitter TX2 may buffer and output the first modulated signal V1 and the second modulated signal V2, respectively. The first transmitter TX1 may provide the first modulated signal V1 to a touch sensing electrode (TSE of FIG. 1) of the touch screen panel 200. As described above with reference to FIG. 6, the first transmitter TX1 may provide the first modulated signal V1 to the touch screen panel 200 through the current amplifying circuit CA of the sensing block 120. The second transmitter TX2 may provide the second modulated signal V2 to the force sensing electrode (FSE of FIG. 1) of the touch screen panel 200.

The sensing block 120 may generate touch location information INF_T and touch force information INF_F based on received sensing signals Ssen. The sensing block 120 may include a receiver 121, an analog-to-digital converter 122, and a processing circuit 123.

The receiver 121 may receive the sensing signal Ssen, amplify and convert the sensing signal Ssen, and output the sensing signal Ssen. The receiver 121 may convert the current-type sensing signal Ssen into a voltage and output the voltage. Although FIG. 7 shows that the receiver 121 includes one current amplifying circuit CA, it is merely for convenience of explanation. As described above with reference to FIGS. 5 and 6, the receiver 121 may include a plurality of current amplifying circuits CA.

The receiver 121 may generate two sensing signals based on one sensing signal Ssen. The receiver 121 may apply a demodulation method corresponding to a modulation method applied for modulating the first modulated signal V1 and the second modulated signal V2 to the sensing signal Ssen, thereby generating a first sensing signal corresponding to the first modulated signal V1 and a second sensing signal corresponding to the second modulated signal V2.

According to an embodiment, the receiver 121 may generate a first sensing signal and a second sensing signal by demodulating sensing signals amplified by the current amplifying circuit CA based on the first modulated signal V1 and the second modulated signal V2, that is, frequencies or phases of the first modulated signal V1 and the second modulated signal V2. According to an embodiment, the receiver 121 may analyze the frequency components of an amplified sensing signal and generate a first sensing signal and a second sensing signal corresponding to a first frequency and a second frequency, respectively. Here, a first frequency may correspond to the frequency of the first modulated signal V1, and a second frequency may correspond to the frequency of the second modulated signal V2. According to an embodiment, the receiver 121 may generate a first sensing signal by integrating an amplified sensing signal for a first time period and generate a second sensing signal by integrating the amplified sensing signal for a second time period. In this case, the lengths of the first time period and the second time period are the same, and the second time period may be continuous to the first time period.

The analog-to-digital converter 122 may perform an analog-to-digital converting operation on voltages output from the receiver 121, that is, the first sensing signal and the second sensing signal, thereby generating first sending data and second sensing data (digital signals). The first sensing data and the second sensing data may be provided to the processing circuit 123.

The processing circuit 123 may generate a touch signal and a force signal by processing the first sensing data and the second sensing data. The processing circuit 123 may generate the touch location information INF_T (e.g., touch coordinates) and touch force information INF_F (e.g., the force of a touch input) based on touch signals and force signals corresponding to the plurality of touch sensing electrodes TSE. The touch location information INF_T and the touch force information INF_F may be provided to a host controller.

According to an embodiment, the processing circuit 123 may compensate for noise of touch signals and force signals. According to an embodiment, the processing circuit 123 may generate a feedback signal for improving sensing sensitivity based on the detected touch signals and the detected force signals and provide the feedback signal to the control logic 130.

The control logic 130 may control the driving block 110 and the sensing block 120. Specifically, the control logic 130 may determine frequencies and amplitudes of driving signals, that is, the first modulated signal V1 and the second modulated signal V2, and transmit control signals based on the determined frequencies or amplitudes to the driving block 110. The control logic 130 may control the timings of a touch sensing operation and a force sensing operation based on timing information INF_TM provided from a display driving circuit DDI.

Furthermore, the control logic 130 may generate a selecting signal SEL (e.g., the first selecting signal SEL1 and the second selecting signal SEL2) based on the timing information INF_TM and provide the sensing signal SEL to a switching unit (e.g., the switching unit 300 of FIGS. 5 and 6).

Figure 8:
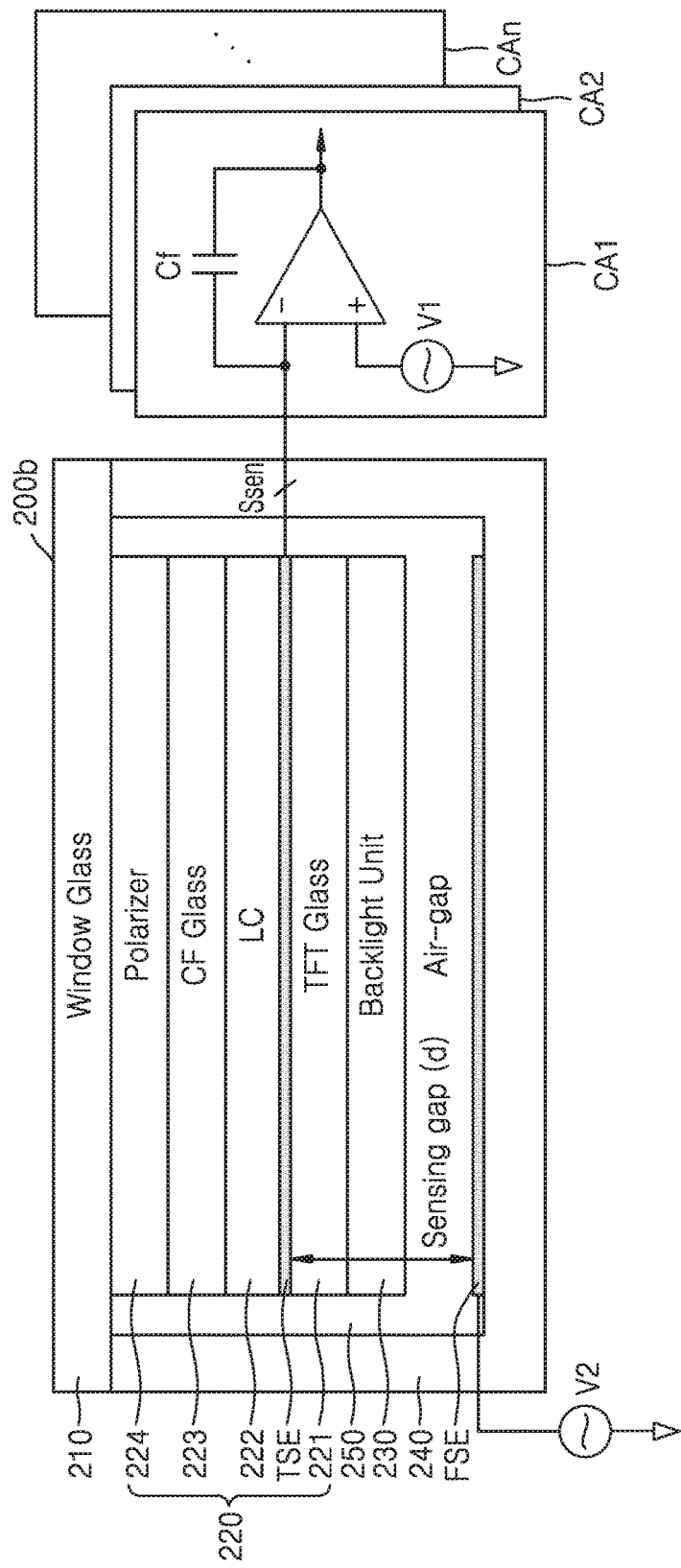
FIG. 8 is a diagram for describing a touch and force sensing method according to an embodiment of the inventive concepts.
Figure 9:
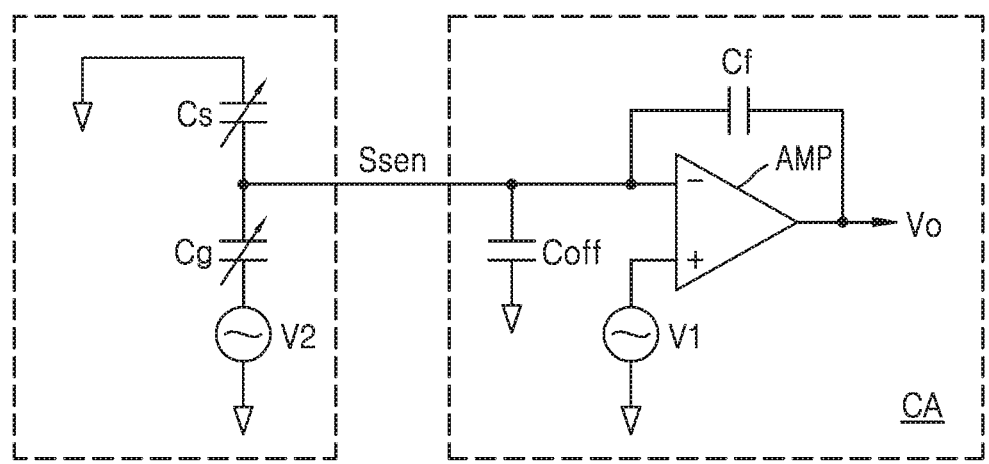
FIG. 9 is a circuit diagram showing a current amplifying circuit and a modeling circuit of capacitances formed in a touch screen panel according to an embodiment of the inventive concepts.

FIG. 8 is a diagram for describing a touch and force sensing method according to an embodiment of the inventive concepts, and FIG. 9 is a circuit diagram showing a current amplifying circuit and a modeling circuit of capacitances formed in a touch screen panel according to an embodiment of the inventive concepts. The touch screen panel 200b may be the in-cell type LCD panel described above with reference to FIG. 4.

Referring to FIG. 8, the LCD layer 220 of the touch screen panel 200b includes a TFT glass 221, a liquid crystal layer 222, a color filter glass 223, and a light polarizing plate 224. The plurality of touch sensing electrodes TSE may be disposed on top of the TFT glass 221. Although FIG. 8 shows that the touch sensing electrode TSE is a single layer, it is merely for convenience of explanation, and the plurality of touch sensing electrodes TSE may be disposed on top of the TFT glass 221. For example, a common electrode may be divided into a matrix and used as the touch sensing electrodes TSE. The force sensing electrode FSE may be disposed on the lower top surface of the frame 240. During a sensing operation period, the second modulated signal V2 may be applied to the force sensing electrode FSE.

The plurality of touch sensing electrodes TSE may be connected to the plurality of current amplifying circuits CA1 through CAn. As described above with reference to FIGS. 5 and 6, the touch sensing electrodes TSE arranged in a same column may be selectively connected to a same current amplifying circuit (e.g., sequentially in order that the touch sensing electrodes TSE are driven). Therefore, the first modulated signal V1 may be applied to the touch sensing electrodes TSE.

When a touch input occurs on a touch screen panel 200c, a sensing capacitance Cs may be formed between the touch sensing electrode TSE and an object and a gap capacitance Cg may be formed between the touch sensing electrode TSE and the force sensing electrode FSE. A capacitance formed on the touch screen panel 200b of FIG. 8 may be modeled as shown in FIG. 9.

Referring to FIG. 9, the current amplifying circuit CA may include the operational amplifier AMP and a feedback capacitor Cf. The current amplifying circuit CA may further include an offset compensating capacitor Coff. The offset compensating capacitor Coff compensates for an offset caused by factors including noise. Alternatively, the offset compensating capacitor Coff may offset a component of an output of the current amplifying circuit CA, wherein the component is based on the feedback capacitor Cf. Although FIG. 9 shows that a first end of the offset compensating capacitor Coff is connected to the first end (−) of the operational amplifier AMP and a ground voltage is applied to a second end of the offset compensating capacitance Coff, the inventive concepts are not limited thereto. An AC signal may be applied to the second end of the offset compensating capacitor Coff. For example, an AC signal having a frequency and a phase identical to those of the first modulated signal V1 may be applied to the second end of the offset compensating capacitor Coff According to an embodiment, the capacitance of the offset compensating capacitor Coff may be identical to the capacitance of the feedback capacitor Cf.

An output signal Vo of the current amplifying circuit CA may be expressed as Equation 2.

$$Vo = \left(\frac{Cs + Cg + Coff + Cf}{Cf}\right)V1 - \left(\frac{Cg}{Cf}\right)V2 + k \quad \text{[Equation 2]}$$

Here, k is a constant and, when an output signal Vo is divided into the first modulated signal V1 and the second modulated signal V2, a component of the output signal Vo related to the second modulated signal V2 corresponds to the gap capacitance Cg, and a component of the output signal Vo related to the first modulated signal V1 corresponds to both the sensing capacitance Cs and the gap capacitance Cg. The first modulated signal V1 and the second modulated signal V2 may be distinguished from each other in terms of frequency, phase, and code. Therefore, the output signal Vo may be divided into a first sensing signal corresponding to the first modulated signal V1 and a second sensing signal corresponding to the second modulated signal V2. Since the second sensing signal reflects a change in the gap capacitance Cg, a force signal may be detected from the second sensing signal. Furthermore, since a signal obtained by subtracting the second sensing signal from the first sensing signal reflects a change in the sensing capacitance Cg, a touch signal may be detected therefrom.

FIGS. 10A through 12 are diagrams showing waveforms of a first modulated signal and a second modulated signal according to some embodiments of the inventive concepts.

Figure 10A:
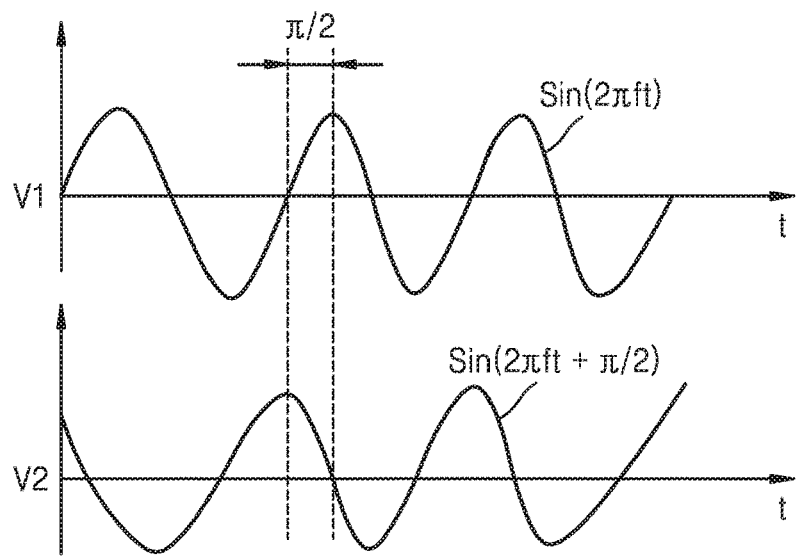
FIGS. 10A through 12 are diagrams showing waveforms of a first modulated signal and a second modulated signal according to some embodiments of the inventive concepts.
Figure 10B:
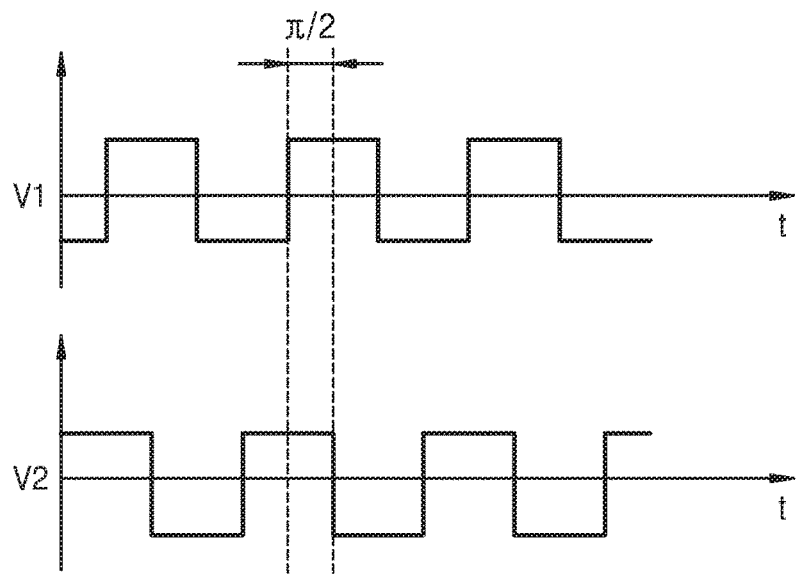

Referring to FIGS. 10A and 10B, the first modulated signal V1 and the second modulated signal V2 may have the same frequency, the same amplitude, and different phases. The phase difference between the first modulated signal V1 and the second modulated signal V2 may be π/2, that is, 90 degrees. For example, as shown in FIG. 10A, the first modulated signal V1 and the second modulated signal V2 may be sinusoidal signals. Since the phase difference between the first modulated signal V1 and the second modulated signal V2 is 90 degrees, the first modulated signal V1 may be a sine signal and the second modulated signal V2 may be a cosine signal. Alternatively, the first modulated signal V1 may be a cosine signal and the second modulated signal V2 may be a sine signal Referring to FIG. 10B, the first modulated signal V1 and the second modulated signal V2 may be square wave signals. The phase of the first modulated signal V1 may be 90 degrees earlier or later than the phase of the second modulated signal V2.

Figure 11A:
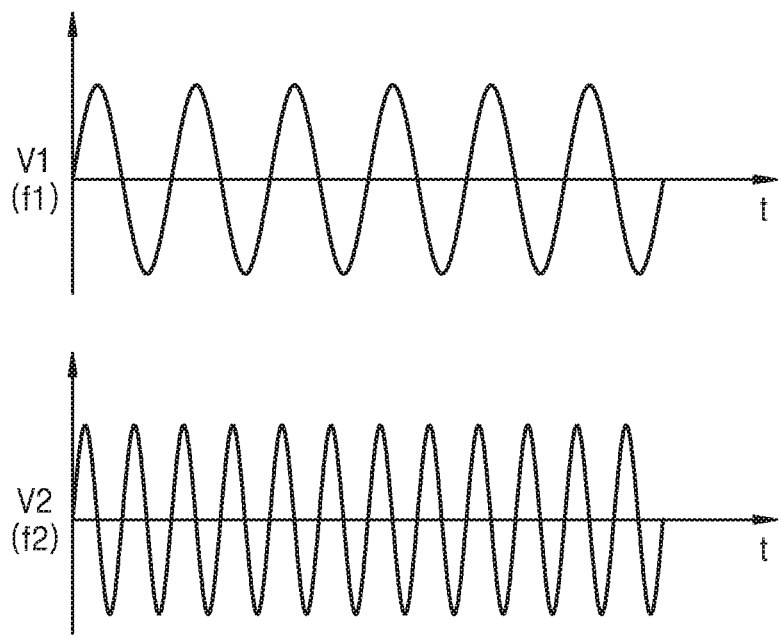
Figure 11B:
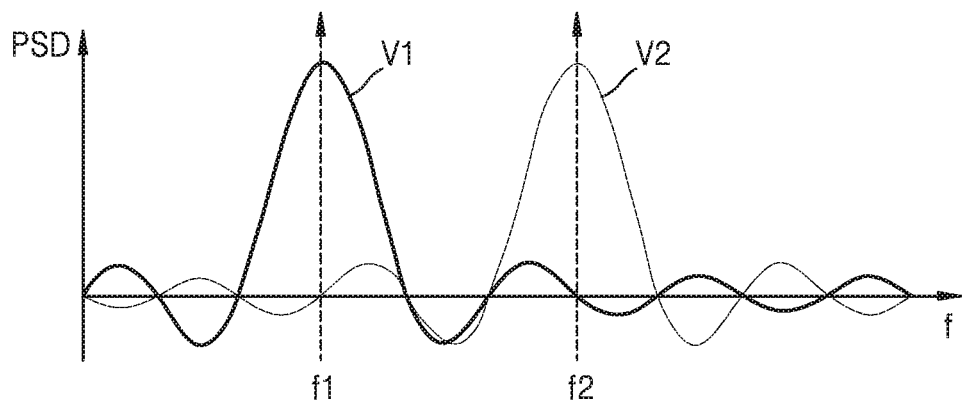

Referring to FIG. 11A, the first modulated signal V1 and the second modulated signal V2 may have the same amplitude, the same phase, and different frequencies. For example, as shown in FIG. 11A, a frequency f1 of the first modulated signal V1 may be less than a frequency f2 of the second modulated signal V2. However, the inventive concepts are not limited thereto, and the frequency f1 of the first modulated signal V1 may be faster than the frequency f2 of the second modulated signal V2. Meanwhile, as shown in FIG. 11B, the frequency f1 of the first modulated signal V1 and the frequency f2 of the second modulated signal V2 may be orthogonal to each other.

Figure 12:
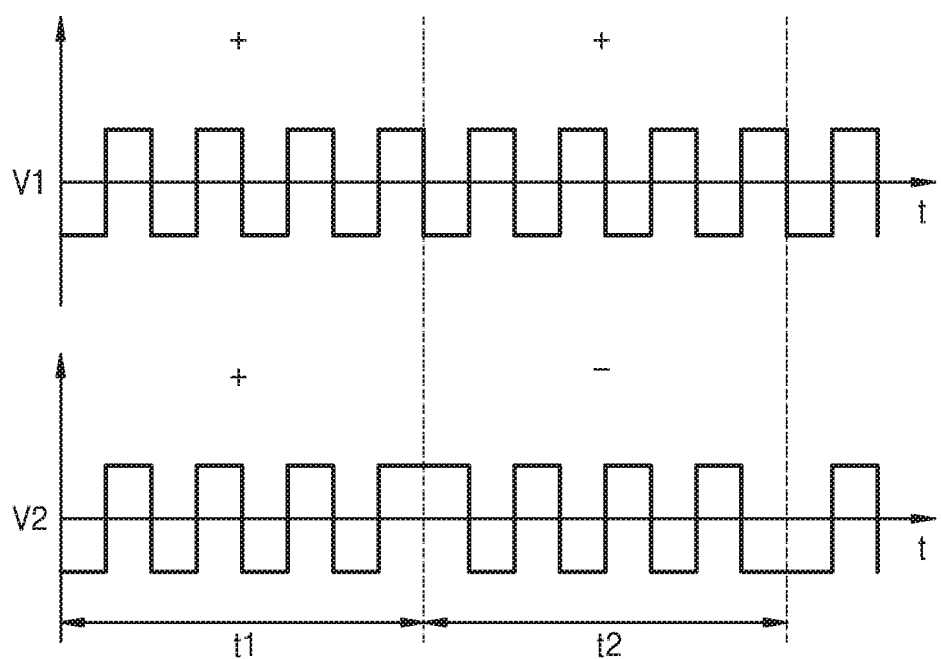

Referring to FIG. 12, the first modulated signal V1 and the second modulated signal V2 may be encoded into corresponding codes, respectively. A code applied to the first modulated signal V1 and a code applied to the second modulated signal V2 may be orthogonal to each other. The first modulated signal V1 and the second modulated signal V2 have the same amplitude and the same period. However, as shown in FIG. 12, the symbol of the first modulated signal V1 and the symbol of the second modulated signal V2 may be identical to each other during a time period t1, and the symbol regarding the second modulated signal V2 may be opposite to the symbol regarding the first modulated signal V1 during a time period t2.

Various examples of the first modulated signal V1 and the second modulated signal V2 have been described above with reference to FIGS. 10A through 12. However, the inventive concepts are not limited thereto, and various modifications may be made therein as long as the first modulated signal V1 and the second modulated signal V2 are modulated by a same modulation method and have different modulated characteristics.

Figure 13A:
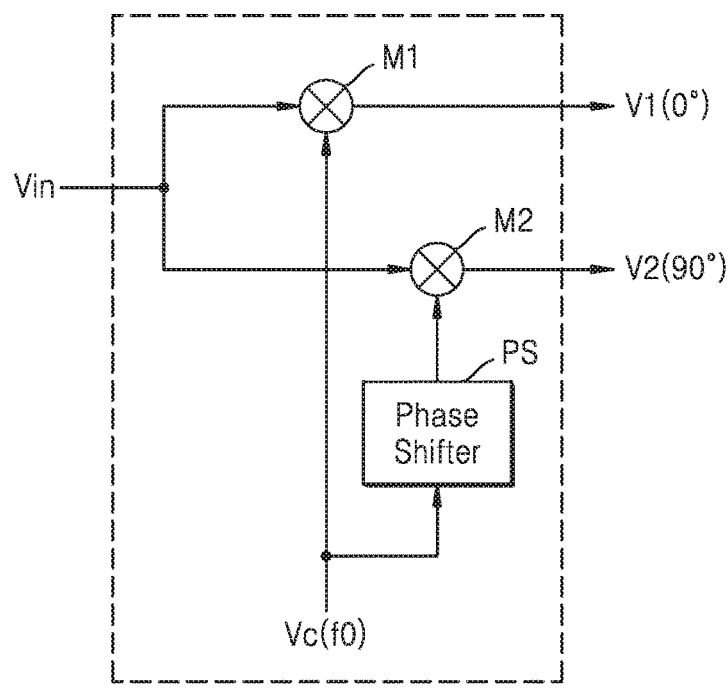
FIGS. 13A and 13B are circuit diagrams each showing an embodiment of a modulating circuit according to an embodiment of the inventive concepts.
Figure 13B:
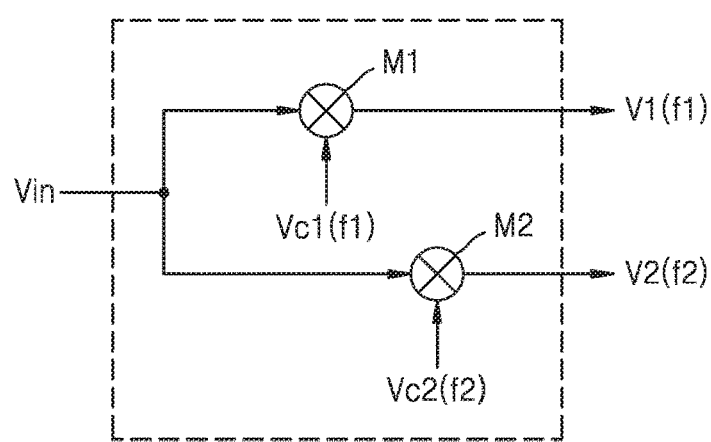

FIGS. 13A and 13B are circuit diagrams each showing an embodiment of a modulating circuit according to the inventive concepts.

Referring to FIG. 13A, a modulation circuit 111a may include a first modulator M1, a second modulator M2, and a phase shifter PS. The first modulator M1 and the second modulator M2 may be implemented as signal mixers, multipliers, etc.

An input signal Vin may be a baseband signal. The first modulator M1 may generate the first modulated signal V1 by modulating the input signal Vin based on a carrier wave Vc. The frequency of the first modulated signal V1 may be equal to the frequency f0 of the carrier wave Vc.

The phase shifter PS may receive the carrier wave Vc and delay or advance the phase of the carrier wave Vc by 90 degrees. The second modulator M2 may generate the second modulated signal V2 by modulating the input signal Vin based on an signal output from the phase shifter PS. Therefore, the first modulated signal V1 and the second modulated signal V2 having the same amplitude, the same frequency, and a phase difference of 90 degrees may be generated.

Referring to FIG. 13B, a modulation circuit 111b may include the first modulator M1 and the second modulator M2. The first modulator M1 may generate the first modulated signal V1 by modulating the input signal Vin based on a first carrier wave Vc1. The second modulator M2 may generate the second modulated signal V2 by modulating the input signal Vin based on a second carrier wave Vc2. The frequency f1 of the first carrier wave Vc1 is different from the frequency f2 of the second carrier wave Vc2.

The frequency of the first modulated signal V1 may be equal to the frequency f1 of the first carrier wave Vc1, whereas the frequency f2 of the second modulated signal V2 may be equal to the frequency f2 of the second carrier wave Vc2. Therefore, the first modulated signal V1 and the second modulated signal V2 may have the same amplitude, the same phase, and different frequencies. According to an embodiment, the frequency f2 of the first modulated signal V1 and the frequency f2 of the second modulated signal V2 may be orthogonal to each other.

As described above with reference to FIG. 13A and FIG. 13B, the modulating circuits 111a and 111b may generate the first modulated signal V1 and the second modulated signal V2 that may be distinguished from each other in terms of phase of frequency through phase modulation or frequency modulation. The first modulated signal V1 and the second modulated signal V2 may be orthogonal to each other.

Figure 14:
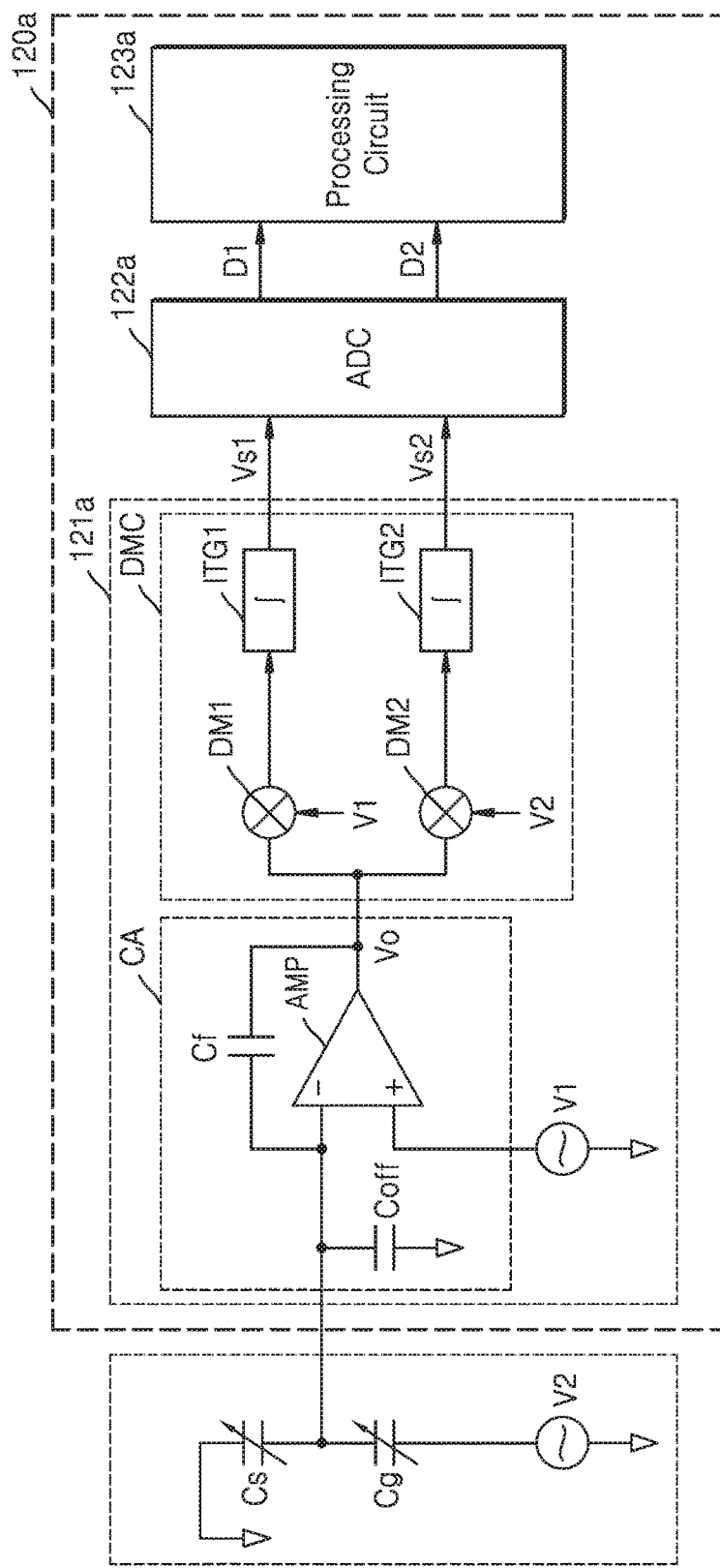
FIG. 14 is a circuit diagram showing an example of a sensing block according to an embodiment of the inventive concepts.

FIG. 14 is a circuit diagram showing an example of a sensing block according to an embodiment of the inventive concepts. A sensing block 120a of FIG. 14 may be applied when the first modulated signal V1 and the second modulated signal V2 are orthogonal to each other in terms of phase or frequency.

Referring to FIG. 14, the sensing block 120a may include a receiver 121a, an analog-digital converter 122a, and a processing circuit 123a, and the receiver 121a may include a current amplifying circuit CA and a demodulating circuit DMC.

As described above with reference to FIG. 9, the output signal Vo of the current amplifying circuit CA may include a first sensing signal based on the first modulated signal V1 and a second sensing signal based on the second modulated signal V2.

The demodulating circuit DMC may include a first demodulator DM1, a second demodulator DM2, a first integrator ITG1, and a second integrator ITG2.

The first demodulator DM1 may demodulate the output signal Vo based on the first modulated signal V1, and the first integrator ITG1 may integrate an output signal of the first demodulator DM1 for one period or integer-multiple periods. The second demodulator DM2 may demodulate the output signal Vo based on the second modulated signal V2 and the second integrator ITG2 may integrate an output signal of the second demodulator DM2 for one period or integer-multiple periods. Since the first modulated signal V1 and the second modulated signal V2 are orthogonal to each other, a first sensing signal Vs1 output from the first integrator ITG1 corresponds to the first modulated signal V1, whereas the second sensing signal Vs2 output from the second integrator ITG2 corresponds to the second modulated signal V2. Referring to Equation 2, the first sensing signal Vs1 reflects changes in the gap capacitance Cg and the sensing capacitance Cs, whereas the second sensing signal Vs2 reflects a change in the gap capacitance Cg.

The analog-to-digital converter 122a converts the first sensing signal Vs1 and the second sensing signal Vs2 as output signals into digital signals. The analog-to-digital converter 122a may generate first sensing data D1 by converting the first sensing signal Vs1 and generate second sensing data D2 by converting the second sensing signal Vs2.

The processing circuit 123a may generate a force signal based on the second sensing data D2. The processing circuit 123a may subtract the second sensing data D2 from the first sensing data D1 and generate a touch signal based on a result of the subtraction. As a result, a touch signal and a force signal may be separated from the sensing signal Ssen. The processing circuit 123 may generate the touch location information INF_T (e.g., touch coordinates) and the touch force information INF_F (e.g., the force of a touch input) based on sensing signals and force signals corresponding to the plurality of touch sensing electrodes TSE. This touch force information INF_F may be generated in any well-known or conventional manner.

Figure 15:
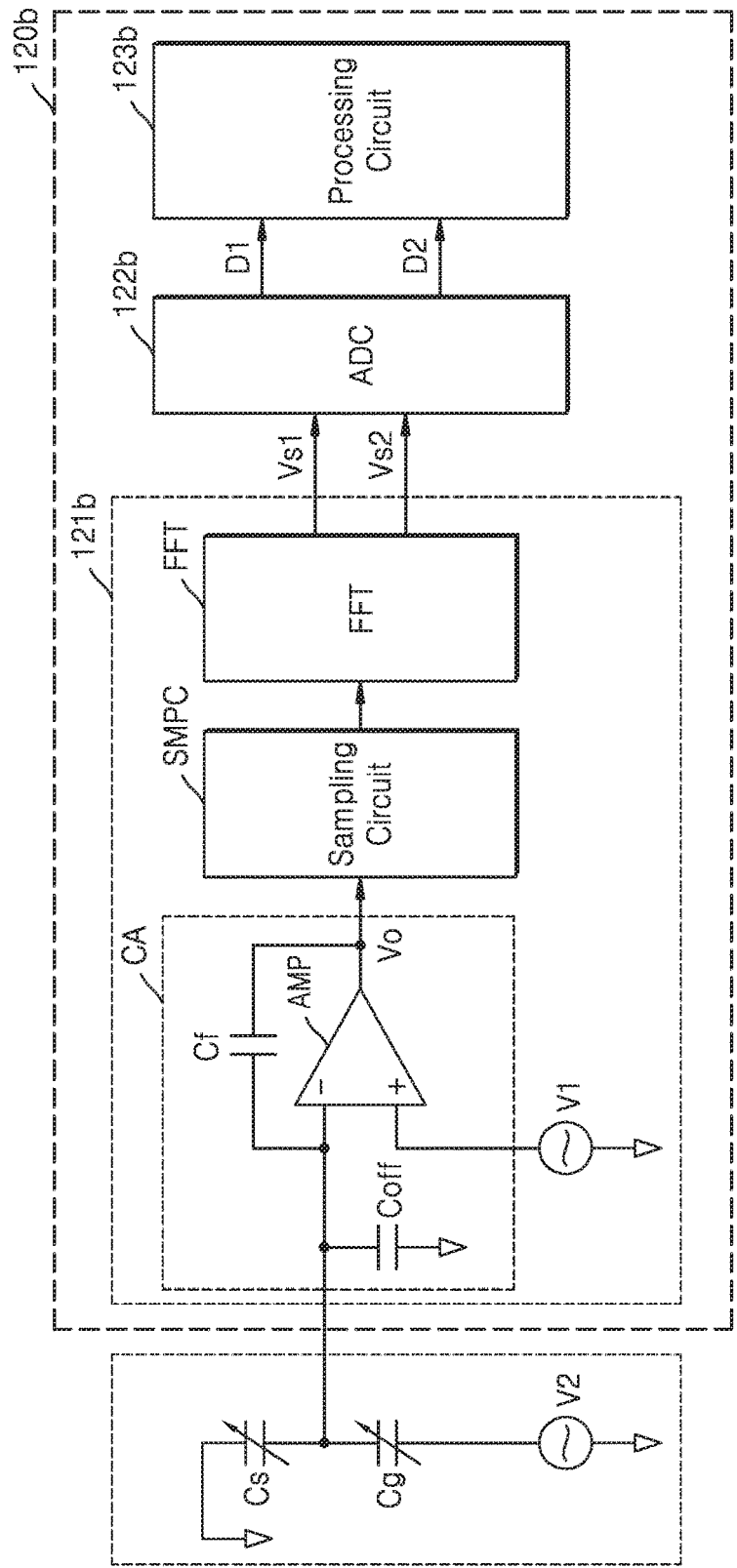
FIG. 15 is a circuit diagram showing an example of a sensing block according to an embodiment of the inventive concepts.

FIG. 15 is a circuit diagram showing an example of a sensing block according to an embodiment of the inventive concepts. The sensing block of FIG. 15 may be applied when the frequency of the first modulated signal V1 and the frequency of the second modulated signal V2 are different from each other. Referring to FIG. 15, a sensing block 120b may include a receiver 121b, an analog-digital converter 122b, and a processing circuit 123b, and the receiver 121b may include the current amplifying circuit CA, a sampling circuit SMPC, and a Fast Fourier Transform circuit FFT. The sampling circuit SMPC may sample the output signal Vo of the current amplifying circuit CA at a high speed. The Fast Fourier Transform circuit FFT may analyze the frequency spectrum of the output signal Vo based on the sampled signal. The Fast Fourier Transform circuit FFT may output a magnitude of the output signal Vo according to a frequency component. As described above, the receiver 121b may analyze the frequency spectrum of the output signal Vo and output the first sensing signal Vs1 and the second sensing signal Vs2 respectively corresponding to the first modulated signal V1 and the second modulated signal V2 from the output signal Vo.

The operations of the analog-to-digital converter 122b and the processing circuit 123b are identical to those of the analog-digital converter 122a and the processing circuit 123a of FIG. 14, and detailed descriptions thereof are omitted for convenience of description.

Figure 16:
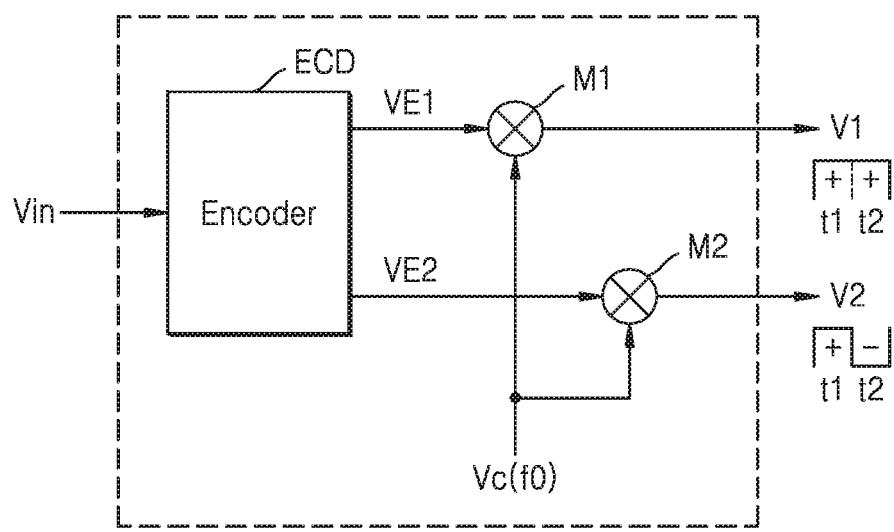
FIG. 16 is a circuit diagram showing an example of a modulating circuit according to an embodiment of the inventive concepts.

FIG. 16 is a circuit diagram showing an example of a modulating circuit according to an embodiment of the inventive concepts.

Referring to FIG. 16, a modulation circuit 111c may include an encoder ECD, the first modulator M1, and the second modulator M2.

The encoder ECD may encode an input signal Vin based on an orthogonal code. The encoder ECD may generate a first encoding signal VE1 and a second encoding signal VE2. The symbol of the first encoding signal VE1 and the symbol of the second encoding signal VE2 may be orthogonal to each other. The first modulator M1 and the second modulator M2 may modulate frequencies of the first encoding signal VE1 based on the carrier wave Vc, thereby generating the first modulated signal V1 and the second modulated signal V2. Therefore, the first modulated signal V1 and the second modulated signal V2 may have the same amplitude, the same frequency, and different symbols.

Figure 17:
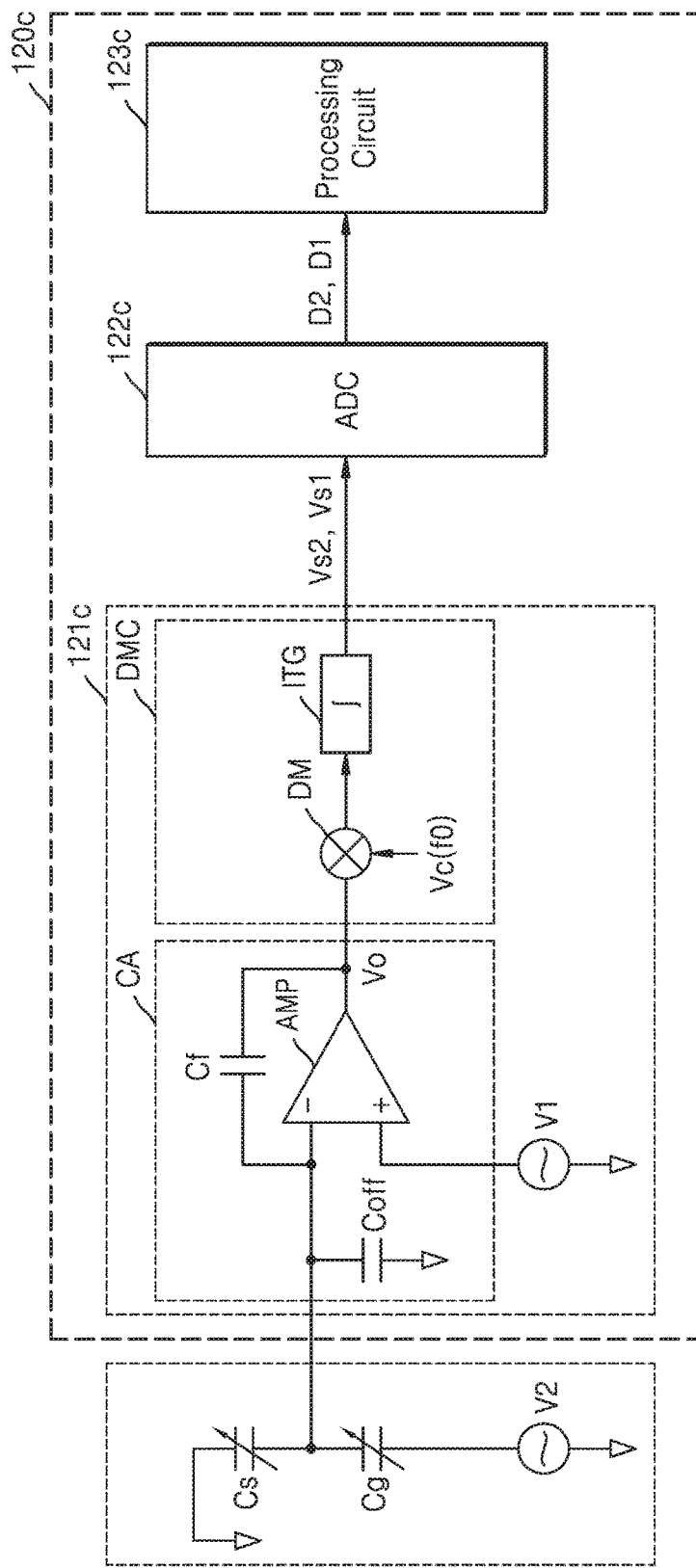
FIG. 17 is a circuit diagram showing an example of a sensing block according to an embodiment of the inventive concepts.

FIG. 17 is a circuit diagram showing an example of a sensing block according to an embodiment of the inventive concepts.

A sensing block 120c of FIG. 17 is an example of a sensing block when the first modulated signal V1 and the second modulated signal V2 are encoded based on an orthogonal code.

Referring to FIG. 17, the sensing block 120c may include a receiver 121c, an analog-digital converter 122c, and a processing circuit 123c. The receiver 121c may include the current amplifying circuit CA and the demodulating circuit DMC.

In FIG. 17, the demodulating circuit DMC may include a demodulator DM and an integrator ITG. The demodulator DM may demodulate the output signal Vo of the current amplifying circuit CA based on the carrier wave Vc, and the integrator ITG may generate the first sensing signal Vs1 by integrating the output of the demodulator DM for one period (e.g., t1 in FIGS. 12 and 16) and generate the second sensing signal Vs2 by integrating the output of the demodulator DM for a next one period (e.g., t2 in FIGS. 12 and 16). The first sensing signal Vs1 is a result of sensing a touch and force based on the first modulated signal V1 and the second modulated signal V2 when the first modulated signal V1 and the second modulated signal V2 have a same waveform, that is, when the first modulated signal V1 and the second modulated signal V2 are substantially identical to each other. Therefore, the first sensing signal Vs1 reflects a change in the sensing capacitance Cs. The second sensing signal Vs2 is a result of sensing a touch and force based on the first modulated signal V1 and the second modulated signal V2 when the symbol of the first modulated signal V1 is opposite to that of the second modulated signal V2, that is, the phases of the first modulated signal V1 and the second modulated signal V2 are opposite to each other. The second sensing signal Vs2 reflects changes in both the sensing capacitance Cs and the gap capacitance Cg.

The analog-to-digital converter 122c generates the first sensing data D1 by converting the first sensing signal Vs1 and provides the first sensing data D1 to the processing circuit 123c. Next, the analog-digital converter 122c generates the second sensing data D2 by converting a received second sensing signal Vs2 and provides the second sensing data D2 to the processing circuit 123c.

The processing circuit 123c generates a touch signal based on the first sensing data D1. The processing circuit 123c may store the first sensing data D1 in a memory, subtract the first sensing data D1 from the second sensing data D2 when the second sensing data D2 is received later, and generate a force signal based on a result of the subtraction.

Examples of the modulation circuit 111 and the sensing block 120 provided in the touch screen controller 100 of FIG. 1 have been described with reference to FIGS. 13A through 17. However, the above-stated embodiments are merely examples, and the inventive concepts are not limited thereto. Components of the modulating circuit and the sensing block may be altered.

Figure 18A:
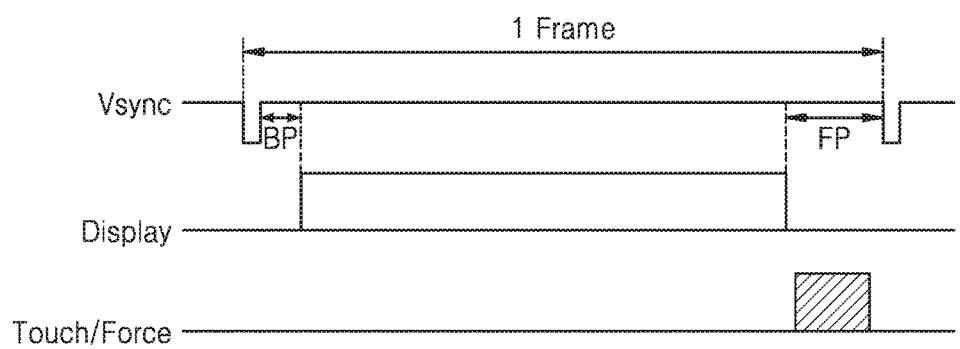
FIGS. 18A through 18C are timing diagrams of a touch sensing apparatus according to an embodiment of the inventive concepts.
Figure 18B:
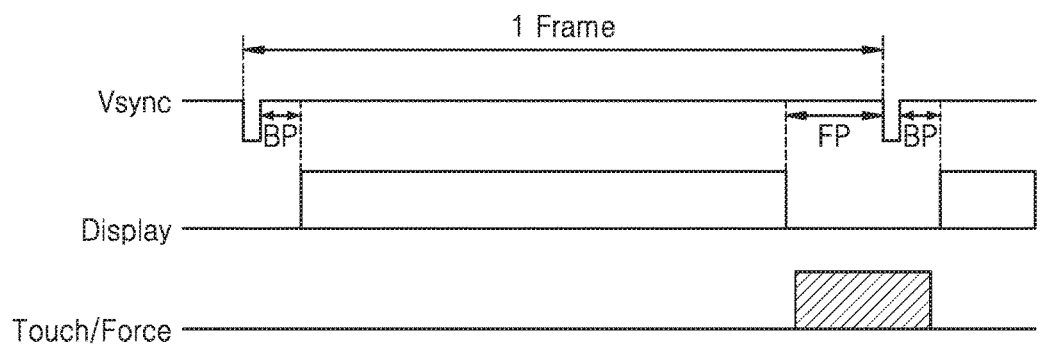
Figure 18C:
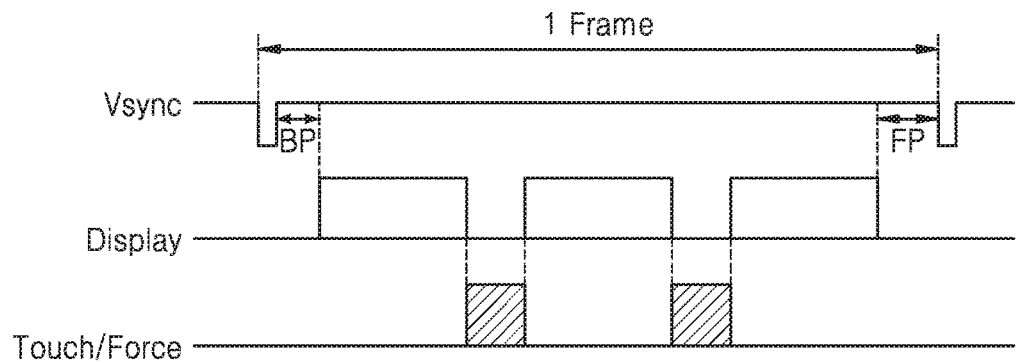

FIGS. 18A through 18C are timing diagrams of a touch sensing apparatus according to an embodiment of the inventive concepts.

Referring to FIGS. 18A through 18C, a frame period may be determined based on a vertical synchronization signal Vsync. For example, when a touch screen panel (200 of FIG. 1) is refreshed at 60 Hz, the frame period may be (1/60)s (second), that is, approximately 16.7 milliseconds. However, it is merely an example, and the frame period of the touch screen panel (200 in FIG. 1) may vary.

A display operation may be performed in a certain section of one frame period, whereas a touch and force driving may be simultaneously performed in other sections of the frame period.

Referring to FIG. 18A, a touch sensing operation and a force sensing operation may be performed on a front porch section FP. Referring to FIG. 18B, the touch sensing operation and the force sensing operation may be performed not only on the front porch section FP within one frame period, but also on a back porch section BP of a next frame period. The touch sensing operation and the force sensing operation driving may be performed before and/or after the display operation is performed.

Referring to FIG. 18C, the touch sensing operation and the force sensing operation may be performed during the display driving period. The display operation and the touch and force sensing operation may be alternately performed during one frame period.

Referring to FIGS. 18A through 18C, the display operation and the touch sensing operation and the display operation and the force sensing operation are performed at different time points, and the touch sensing operation and the force sensing operation may be performed at the same time.

Figure 19:
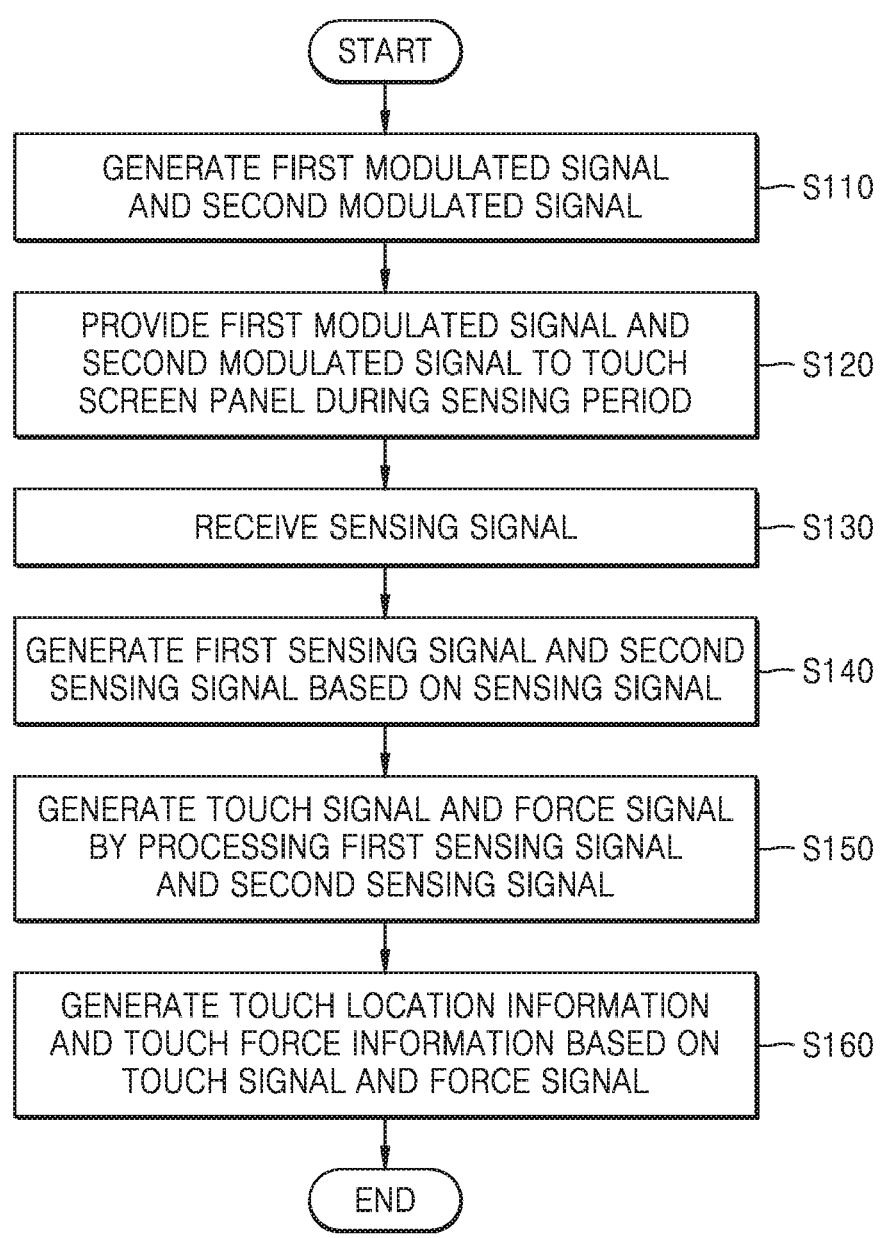
FIG. 19 is a flowchart showing a method of operating a touch screen controller according to an embodiment of the inventive concepts.

FIG. 19 is a flowchart showing a method of operating a touch screen controller according to an embodiment of the inventive concepts. The operation method of FIG. 19 may be applied to the touch screen controller 100 according to the above-described embodiments. Therefore, the description of the touch screen controller 100 given above with reference to FIGS. 1 through 18 may be applied to the present embodiment.

Referring to FIG. 19, a first modulated signal and a second modulated signal may be generated (operation S110). The first modulated signal and the second modulated signal may be signals modulated according to a same modulation method, but may have different modulated characteristics. The first modulated signal and the second modulated signal may be orthogonal to each other. For example, the frequency of the first modulated signal and the frequency of the second modulated signal may be orthogonal to each other. Alternatively, the phase difference between the first modulated signal and the second modulated signal may be 90 degrees. According to an embodiment, the frequencies of the first modulated signal and the second modulated signal may be different from each other. The first modulated signal and the second modulated signal may be distinguished from each other in terms of phase, frequency, and code.

The first modulated signal and the second modulated signal may be provided to a touch screen panel during a sensing period (operation S120). For touch sensing, a touch sensing electrode, e.g., a common electrode, may be driven by a first modulated signal and, at the same time, a second modulated signal may be applied to a force sensing electrode, and thus the touch sensing electrode and the force sensing electrode may be driven simultaneously.

The sensing signal is received (operation S130) and a first sensing signal and a second sensing signal may be generated based on the sensing signal (operation S140). The sensing signal may include a touch signal and a force signal. Furthermore, the touch signal and the force signal may be reflected from the first modulated signal and the second modulated signal as amounts of changes of a gap capacitance and a sensing capacitance, respectively.

Therefore, the sensing signal may be divided into the first sensing signal corresponding to the first modulated signal and the second sensing signal corresponding to the second modulated signal by using a demodulation method corresponding to a modulation method applied to the first modulated signal and the second modulated signal. For example, fast Fourier transform, orthogonal frequency conversion, orthogonal code decoding, or IQ demodulation may be applied for demodulation.

According to an embodiment, the sensing signal may be amplified and converted (e.g., current-to-voltage conversion) and the amplified sensing signal may be modulated based on the first modulated signal and the second modulated signal.

For example, when the first modulated signal and the second modulated signal are orthogonal to each other, results obtained by multiplying the amplified sensing signal by the first modulated signal and the second modulated signal are integrated, thereby generating a first sensing signal corresponding to the first modulated signal and a second sensing signal corresponding to the second modulated signal.

In another example, when the symbol of the first modulated signal and the symbol of the second modulated signal are orthogonal to each other, the first sensing signal and the second sensing signal may be generated by integrating the amplified sensing signal during time periods different from each other.

When the frequency of the first modulated signal and the frequency of the second modulated signal are different from each other, a first sensing signal and a second sensing signal are generated by analyzing frequency components of the amplified sensing signal.

As the first sensing signal and the second sensing signal are converted into digital signals and a processing is performed based on the converted digital signals, touch signal and a force signal may be generated.

Therefore, when the first sensing signal and the second sensing signal are generated, the first sensing signal and the second sensing signal may be processed, thereby generating touch and force signals (operation S150).

Next, touch location information and force information may be generated based on a touch signal and a force signal (operation S160). This information may be generated in any well-known or conventional manner.

According to a method of operating a touch screen controller according to an embodiment of the inventive concepts, a touch driving and a force driving may be simultaneously performed based on the first modulated signal and the second modulated signal that may be distinguished from each other in terms of frequency, code, and phase, signals corresponding to first modulated signal and the second modulated signal are separated from sensed signals, and a touch signal and a force signal may be generated based on results of the separation. Therefore, since the touch driving and the force driving are simultaneously performed, a longer sensing time may be secured as compared to a case where a touch driving and a force driving are performed in a time-sharing manner, and thus the sensing performance may be improved. Furthermore, since a longer display driving period may be secured, the image quality of a touch screen panel may be improved.

Figure 20:
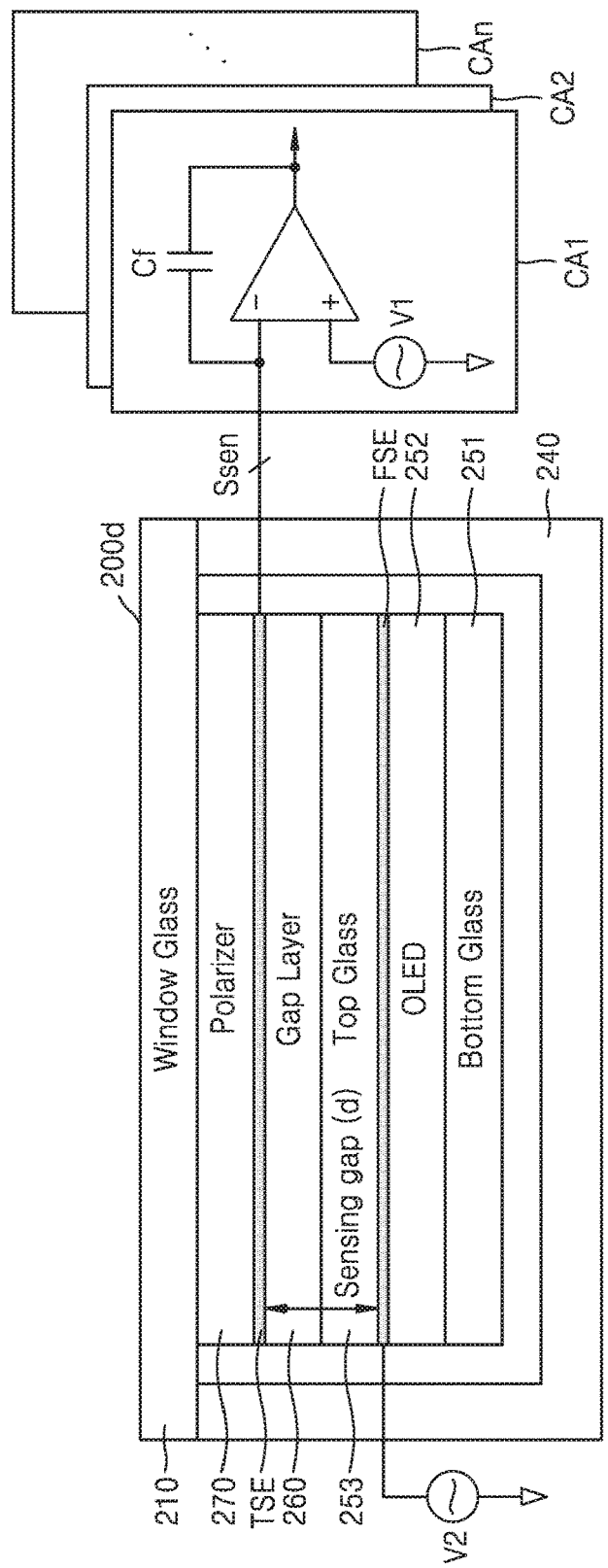
FIG. 20 is a diagram for describing a touch and force sensing method according to an embodiment of the inventive concepts.

FIG. 20 is a diagram for describing a touch and force sensing method according to an embodiment of the inventive concepts. A touch screen panel 200d may be an on-cell type OLED panel, and the touch sensing electrode TSE may be formed over a top glass 253.

Referring to FIG. 20, the touch screen panel 200d includes the window glass 210, a light polarizing plate 270, a gap layer 260, a top glass 253, an OLED layer 252, a bottom glass 251, and the frame 240. For example, the top glass 253 may be a color filter glass or a cover glass. The bottom glass 251 may be a TFT glass or an OLED glass. Furthermore, various types of layers may be between the layers shown in FIG. 20.

The plurality of touch sensing electrodes TSE may be formed below the light polarizing plate 270 and the force sensing electrode FSE may be formed above the OLED layer. According to an embodiment, the force sensing electrode FSE may include one or more of the elements constituting an OLED pixel, e.g, a source driving line, a gate line, an anode sub-pixel electrode, and a cathode pixel electrode. The force sensing electrode FSE may be a common electrode to which a common voltage of the OLED display, e.g., ELVSS, is applied.

The gap layer 260 may be between the force sensing electrode FSE and the touch sensing electrode TSE. The gap layer 260 may be an insulating film or an air gap. Furthermore, the gap layer 260 may include an insulating material. The thickness of the gap layer 260 may be reduced by an external touch force. The sensing capacitance of the force sensing electrode FSE and the touch sensing electrode TSE may vary due to the reduction of the thickness of the gap layer 260 due to an external touch force.

During a sensing operation period, the second modulated signal V2 is applied to the force sensing electrode FSE. The plurality of touch sensing electrodes TSE may be sequentially connected to corresponding current amplifying circuits from among the current amplifying circuits CA1 through CAn. Therefore, the first modulated signal V1 may be applied to the touch sensing electrode TSE. Therefore, a touch sensing operation and a force sensing operation may be performed simultaneously.

The first modulated signal V1 and the second modulated signal V2 are signals that may be distinguished from each other based on frequency, phase, code, etc. Therefore, a sensing block (e.g., 120 of FIG. 1) of a touch screen controller connected to the touch screen panel 200d may divide a sensing signal into a first modulated signal and a second modulated signal respectively corresponding to the first modulated signal and the second modulated signal and process the first sensing signal and the second sensing signal, thereby generating a touch signal and a driving signal.

Figure 21:
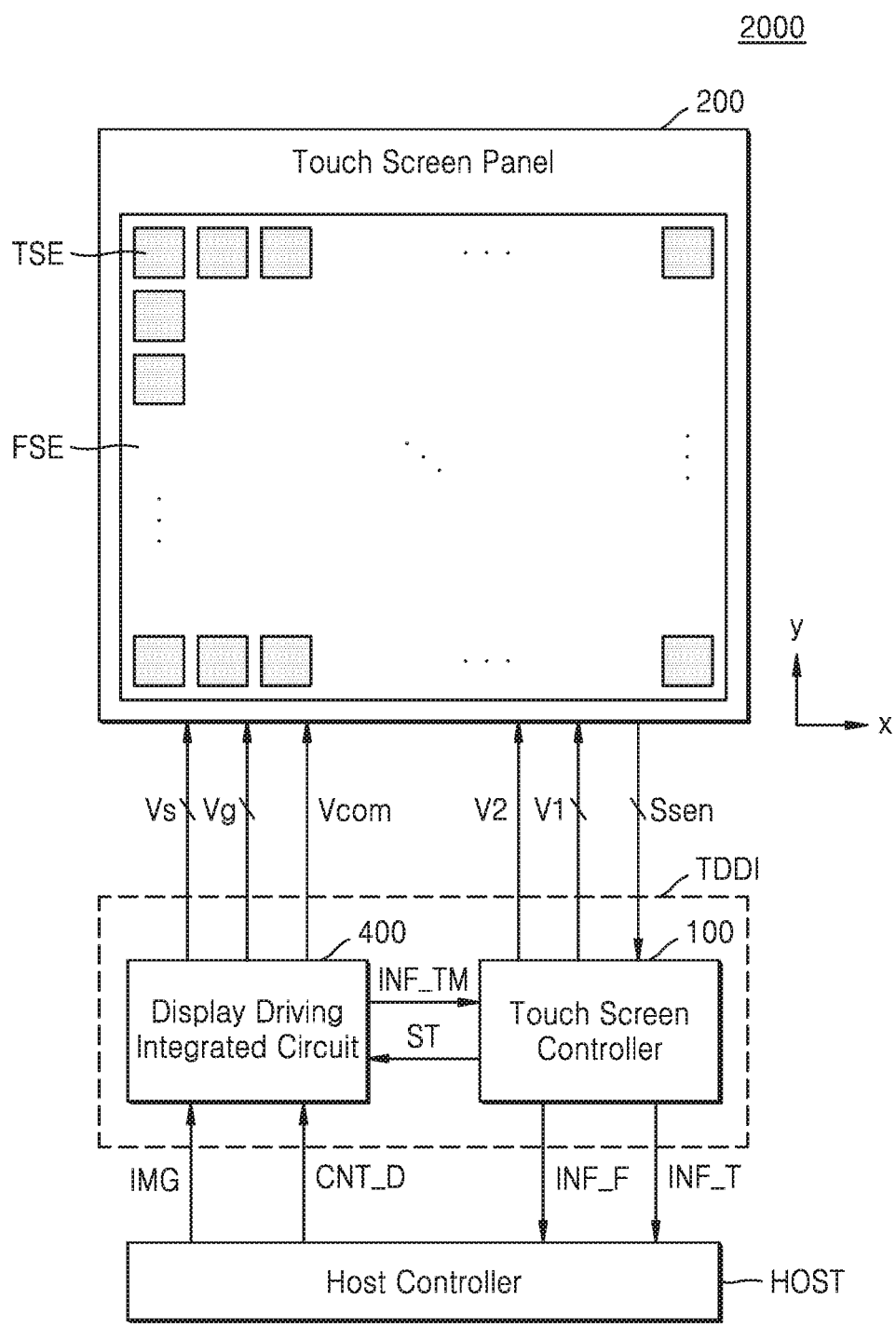
FIG. 21 is a block diagram showing a display system according to an embodiment of the inventive concepts.

FIG. 21 is a block diagram showing a display system according to an embodiment of the inventive concepts.

Referring to FIG. 21, a display system 2000 may include a touch screen panel 200, a touch screen controller 100, and a display driving circuit 400.

The touch screen panel 200 has a structure in which a touch panel and a display panel are combined with each other. For example, the touch sensing electrode TSE may be provided in a display pixel as an in-cell type. However, the inventive concepts are not limited thereto and, according to an embodiment, the touch screen panel 200 may be implemented in various forms, such as an on-cell type panel.

The touch screen controller 100 and the display driving circuit 400 may be embodied in a single semiconductor chip and may be referred to as a touch DDI chip TDDI. However, the inventive concepts are not limited thereto, and the touch screen controller 100 and the display driving circuit 400 may be embodied as separate chips.

The display driving circuit 400 drives the display of the touch screen panel 200. The display driving circuit 400 may provide a common voltage Vcom, gate voltages Vg, and source voltages Vs (or data signals) to the touch screen panel 200.

The display driving circuit 400 may receive a video signal and a control signal CNT_D from a host controller HOST and drive the touch screen panel 200 based on the received video signal and the received control signal CNT_D. For example, the host controller HOST may be implemented as a system on chip (SoC), such as an application processor (AP) or the like. The display driving circuit 400 may provide the timing information INF_TM to the touch screen controller 100. For example, the timing information INF_TM may include a vertical synchronization signal, a horizontal synchronization signal, and the like.

The touch screen controller 100 may detect a touch location and a touch force regarding a touch occurring on the touch screen panel 200. The touch screen controller 100 may simultaneously apply the first modulated signal V1 and the second modulated signal V2, which are distinguished from each other based on frequency, phase, or code characteristics, to the touch sensing electrode TSE and the force sensing electrode FSE and detect signals corresponding to the first modulated signal V1 and the second modulated signal V2 from the sensing signal sensing signal, thereby detecting touch signals and input signals at the same time.

The touch screen controller 100 may generate touch location information INF_T and touch force information INF_F based on the detected touch signal and force signal and provide the touch location information INF_T and the touch force information INF_F to the host controller HOST.

The touch screen controller 100 may generate various timing signals (e.g., a multiplexer control signal) based on the timing information INF_TM provided from the display driving circuit 400.

The touch screen controller 100 may provide a display signal ST to the display driving circuit 400. Furthermore, the touch screen controller 100 may perform a touch sensing operation and the force sensing operation in a period other than the display driving period, based on the timing information INF_TM. The video being displayed may be divided into frames, and the display driving period may have a front porch, back porch, horizontal blanking interval, vertical blanking interval, etc. The touch screen controller may be configured to control the timing of the combined touch and force sensing operation such that the combined touch and force sensing operation is performed at least once each frame. The touch screen controller may be configured to control the timing of the combined touch and force sensing operation such that the combined touch and force sensing operation is performed more than once each frame. The touch screen controller may be configured to control the timing of the combined touch and force sensing operation such that the combined touch and force sensing operation is performed eight times each frame. The touch screen controller may be configured to control the timing of the combined touch and force sensing operation such that the combined touch and force sensing operation is performed during a horizontal sync interval of a frame. The touch screen controller may be configured to control the timing of the combined touch and force sensing operation such that the combined touch and force sensing operation is performed during a horizontal blanking interval of a frame. The touch screen controller may be configured to control the timing of the combined touch and force sensing operation such that the combined touch and force sensing operation is performed during a vertical blanking interval of a frame. The touch screen controller may be configured to control the timing of the combined touch and force sensing operation such that the combined touch and force sensing operation is performed during a front porch interval of a frame. The touch screen controller may be configured to control the timing of the combined touch and force sensing operation such that the combined touch and force sensing operation is performed during a back porch interval of a frame. Furthermore, the may be configured to control the timing of the combined touch and force sensing operation according to one or more of the above noted options.

FIGS. 22A through 22D are schematic vertical cross-sectional diagrams showing stacked structures of touch screen panels according to embodiments of the inventive concepts.

Figure 22A:
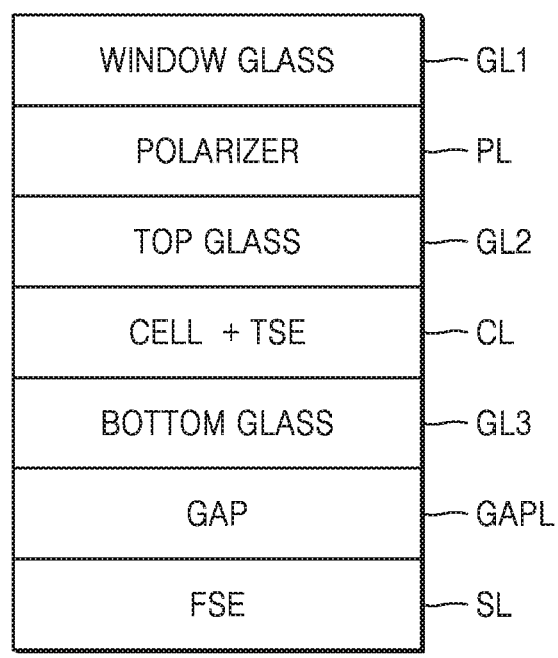
FIGS. 22A through 22D are schematic vertical cross-sectional diagrams showing stacked structures of touch screen panels according to embodiments of the inventive concepts.

Referring to FIG. 22A, a light polarizing plate PL, a top glass GL2, a cell layer CL, a bottom glass GL3, the gap layer GAPL, and a sensing layer SL may be stacked below a window glass GL1. The force sensing electrode FSE may be disposed at the sensing layer SL. The touch screen panel shown in FIG. 22A is an in-cell type panel, where the touch sensing electrode TSE may be disposed at the cell layer CL. For example, the touch sensing electrode TSE may include one of a common electrode, a cell electrode, a source driving line, a gate line, an anode sub pixel electrode, and a cathode pixel electrode.

The force sensing electrode FSE may be disposed below the bottom glass GL3 and may be disposed on the top surface of a frame (not shown), for example.

Figure 22B:
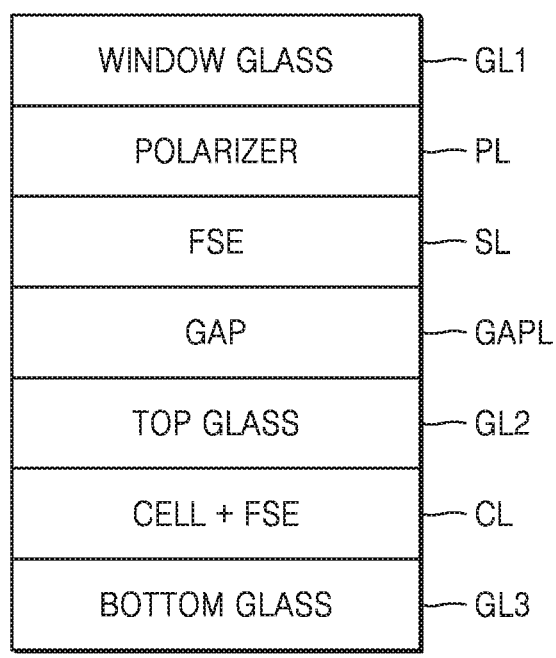

Referring to FIG. 22B, the light polarizing plate PL, the sensing layer SL, the gap layer GAPL, the top glass GL2, the cell layer CL, and the bottom Glass GL3 may be stacked below the window glass GL1. The touch screen panel of FIG. 22B is an in-cell type panel, where the touch sensing electrode TSE may be disposed at the cell layer CL.

Meanwhile, the force sensing electrode TSE may be disposed at the sensing layer SL. The force sensing electrode TSE may be disposed above the touch sensing electrode TSE.

Figure 22C:
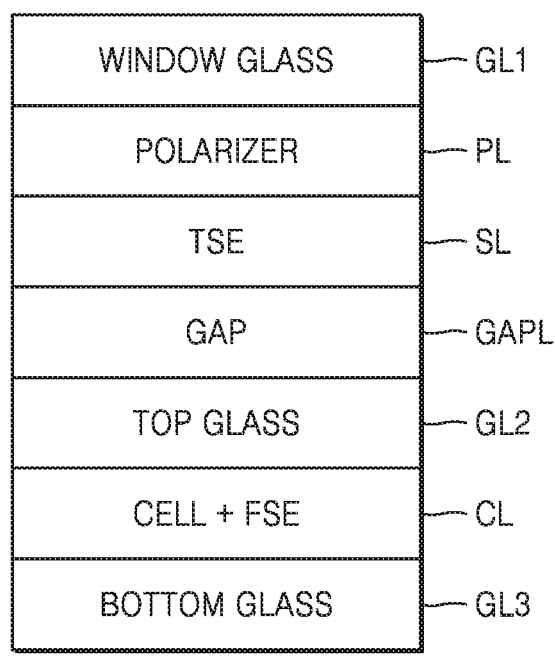

Referring to FIG. 22C, the light polarizing plate PL, the sensing layer SL, the gap layer GAPL, the top glass GL2, the cell layer CL, and the bottom Glass GL3 may be stacked below the window glass GL1.

The touch screen panel shown in FIG. 22C is an on-cell type panel, where a touch sensing electrode TSE may be disposed above the top glass GL2. The gap layer GAPL may be between the touch sensing electrode TSE and the top glass GL2. The force sensing electrode FSE may be disposed at the cell layer CL. The force sensing electrode FSE may include some elements of a display pixel.

Figure 22D:
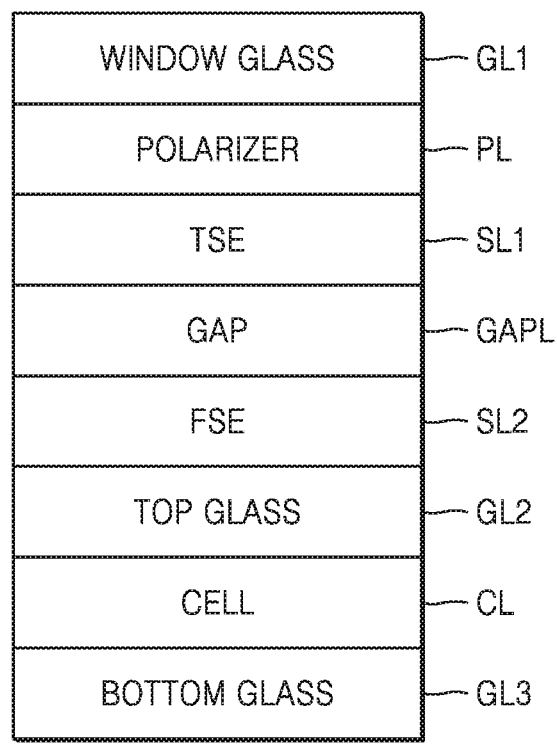

Referring to FIG. 22D, the light polarizing plate PL, a first sensing layer SL1, the gap layer GAPL, a second sensing layer SL2, the top glass GL2, the cell layer CL, and the bottom glass GL3 may be stacked below the window glass GL1.

The touch sensing electrode TSE may be disposed at the first sensing layer SL1, whereas the force sensing electrode FSE may be disposed at the second sensing layer SL2. The gap layer GAPL may be between the touch sensing electrode TSE and the force sensing electrode FSE. The touch screen panel of FIG. 22D is an on-cell type panel, where the touch sensing electrode TSE may be disposed above the top glass GL2 and the force sensing electrode FSE and gap layer GAPL may also be disposed above the top glass GL2.

Various embodiments of stacked structure of a touch screen panel have been described with reference to FIGS. 22A through 22D. However, the inventive concepts are not limited thereto, and various modifications may be made in the stacked structures. Furthermore, various layers not shown may be between the layers shown in FIGS. 22A through 22D.

Figure 23:
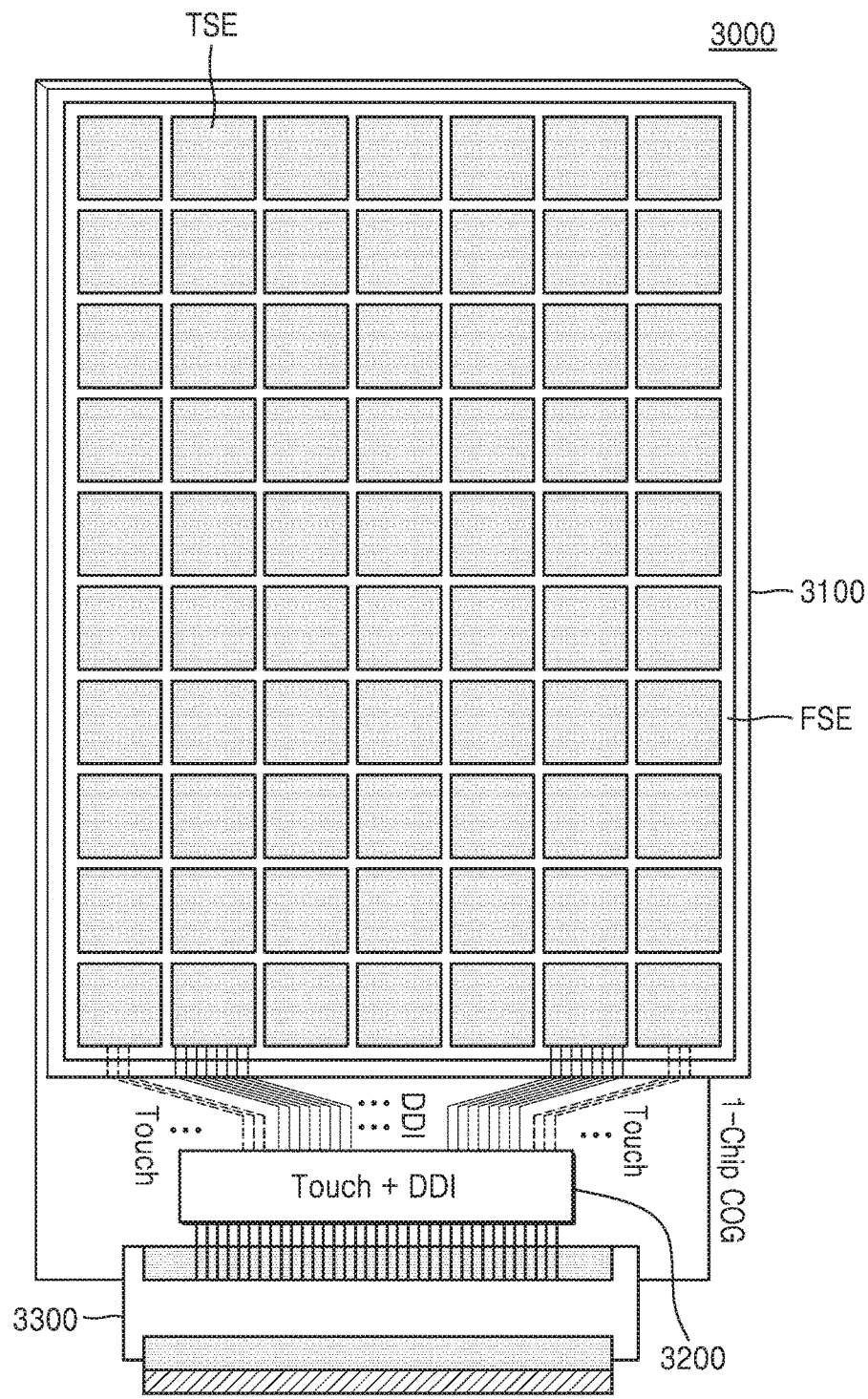
FIG. 23 is a diagram showing a structure of a display system according to an embodiment of the inventive concepts.

FIG. 23 is a diagram showing a structure of a display system according to an embodiment of the inventive concepts.

Referring to FIG. 23, a display system 3000 may include a touch screen panel 3100 and a touch DDI chip 3200. The touch screen panel 3100 may be an in-cell type panel in which the touch sensing electrode TSE is combined with a display pixel cell. The touch screen panel 3100 may include the plurality of touch sensing electrodes TSE and the force sensing electrode FSE. According to an embodiment, the plurality of touch sensing electrodes TSE may be common electrodes to which a common voltage is applied during a display operation. The touch sensing electrode TSE may perform a display function as a common electrode during a display operation and may perform a touch sensing function and a force sensing function during a touch sensing operation and a force sensing operation.

The touch DDI chip 3200 is mounted as a chip-on-glass (COG) and may communicate with the touch screen panel 3100 through a plurality of conductive lines. For example, the touch DDI chip 3200 may provide a signal for implementing an image to the touch screen panel 3100, provide driving signals, e.g., a first modulated signal and a second modulated signal, to the plurality of touch sensing electrodes TSE and the force sensing electrode FSE in the touch screen panel 3100, and receive a sensing signal from the touch screen panel 3100. The touch DDI chip 3200 may communicate with an external system (e.g., a host like an AP) via a flexible printed circuit board (FPCB) and may drive the touch screen panel 3100 under the control of the external system. Although FIG. 23 shows that the touch DDI chip 3200 is mounted as a COG, the touch DDI chip 3200 may be mounted in various other forms. For example, the touch DDI chip 3200 may be mounted as a chip on flexible printed circuit (COF).

While the inventive concepts have been particularly shown and described with reference to embodiments thereof, it will be understood that various changes in form and details may be made therein without departing from the spirit and scope of the following claims.

I claim:

1. A touch screen controller, comprising:
a sensing circuit configured to generate touch data and force data by processing a single output signal from a touch panel, the touch data indicating whether a touch input is detected, and the force data indicating an amount of force of the touch input; and
a driving circuit configured to generate a first modulated signal and a second modulated signal for supply to a first sensing electrode and a second sensing electrode, respectively, of the touch panel, the first modulated signal and the second modulated signal having different modulated characteristics, wherein
the sensing circuit is further configured receive the single output signal from the first sensing electrode, generate a composite sensing signal from the single output signal, generate a first sensing signal corresponding to the first modulated signal from the composite sensing signal, generate a second sensing signal corresponding to the second modulated signal from the composite sensing signal, and determine the touch data and the force data from the first sensing signal and second sensing signal.

2. The touch screen controller of claim 1, wherein the first modulated signal and second modulated signal have different phases.

3. The touch screen controller of claim 2, wherein
the sensing circuit is configured to demodulate the composite sensing signal using the first modulated signal to generate the first sensing signal; and
the sensing circuit is configured to demodulate the composite sensing signal using the second modulated signal to generate the second sensing signal.

4. The touch screen controller of claim 1, wherein
the first modulated signal and the second modulated signal have different frequencies.

5. The touch screen controller of claim 4, wherein
the sensing circuit is configured to perform a fast Fourier transform operation and at least one filter operation on the composite sensing signal to generate the first sensing signal and the second sensing signal.

6. The touch screen controller of claim 1, wherein
the first modulated signal and the second modulated signal are differently encoded versions of a same carrier.

7. The touch screen controller of claim 6, wherein
the sensing circuit is configured to demodulate the composite sensing signal using the same carrier and integrate over a first period to generate the first sensing signal; and
the sensing circuit is configured to demodulate the composite sensing signal using the same carrier and integrate over a second period to generate the second sensing signal.

8. The touch screen controller of claim 1, wherein
the sensing circuit is configured to convert the first sensing signal to first digital data, convert the second sensing signal to second digital data, generate the force data based on the second digital data, and generate the touch data based on a difference between the first digital data and the second digital data.

9. The touch screen controller of claim 1, wherein
the first and second modulated signals are AC signals.

10. The touch screen controller of claim 1, wherein the sensing circuit comprises:
an operational amplifier configured to generate the composite sensing signal from the single output signal.

11. The touch screen controller of claim 10, wherein a first input of the operational amplifier is configured to receive the single output signal, and a second input of the operation amplifier is configured to receive the first modulated signal.

12. The touch screen controller of claim 1, wherein the composite sensing signal includes a first signal component and a second signal component, the first signal component representative of a touch indicative capacitance and a force indicative capacitance, and the second signal component representative of the force indicative capacitance.

13. The touch screen controller of claim 12, wherein the sensing circuit is configured to generate the first sensing signal corresponding to the first signal component, generate the second sensing signal corresponding to the second signal component, generate the force data based on the second sensing signal, and generate the touch data based on the first sensing signal and the second sensing signal.

14. A system, comprising:
a first sensing electrode at a first layer;
a second sensing electrode at a second layer, the second layer spaced from the first layer, and the second sensing electrode facing the first sensing electrode;
a supply circuit configured to selectively provide a first modulated signal to the first sensing electrode, and selectively provide a second modulated signal to the second sensing electrode, the first modulated signal and the second modulated signal having different modulated characteristics; and
a sensing circuit configured to generate touch data and force data by processing a single output signal from the first sensing electrode, the touch data indicating whether a touch input is detected, and the force data indicating an amount of force of the touch input.

15. The system of claim 14, further comprising:
a driving circuit configured to generate the first modulated signal and the second modulated signal.

16. The system of claim 14, wherein
a first plurality of the first sensing electrodes are at the first layer; and
the second sensing electrode faces the first plurality of the first sensing electrodes.

17. The system of claim 16, wherein
the supply circuit selectively connects one of the first plurality of the first sensing electrodes to the sensing circuit.

18. The system of claim 14, wherein
the supply circuit is configured to supply a common voltage to the first and second sensing electrodes during a display operation, and to supply the first modulated signal and the second modulated signal to the first sensing electrode and the second sensing electrode, respectively, during a combined touch and force sensing operation.

19. The system of claim 18, further comprising:
control logic configured to control the supply circuit to control timing of the combined touch and force sensing operation.

* * * * *